(12) United States Patent
Rabenhorst

(10) Patent No.: US 7,550,297 B2
(45) Date of Patent: Jun. 23, 2009

(54) SYNTHETIC IRON OXIDES AND THEIR USE AS AN INDICATOR OF REDUCTION IN SOILS (IRIS)

(75) Inventor: Martin C. Rabenhorst, University Park, MD (US)

(73) Assignee: University of Maryland, College Park, College Park, MD (US)

( * ) Notice: Subject to any disclaimer, the term of this patent is extended or adjusted under 35 U.S.C. 154(b) by 210 days.

(21) Appl. No.: 11/678,995

(22) Filed: Feb. 26, 2007

(65) Prior Publication Data

US 2008/0038826 A1  Feb. 14, 2008

Related U.S. Application Data

(60) Provisional application No. 60/743,655, filed on Mar. 22, 2006.

(51) Int. Cl.
*G01N 31/00* (2006.01)

(52) U.S. Cl. .......................... 436/8; 106/456; 116/206; 423/632; 524/431

(58) Field of Classification Search ................. 436/164; 116/206; 73/73
See application file for complete search history.

(56) References Cited

U.S. PATENT DOCUMENTS 6,766,762 B2 *  7/2004  Jenkinson et al. ........... 116/206

OTHER PUBLICATIONS

Castenson, K.L. (2004) "Hydromorphology of Piedmont Floodplain Soils" M.S. Thesis, University of Maryland.
Anonymous (2006) "Field Indicators of Hydric Soils in the United States, A Guide for Identifying and Delineating Hydric Soils, Version 6.0" U.S. Army Corps of Engineers.
Anonymous (2000) The Hydric Soil Technical Standard, Deliberations of National Technical Committee for Hydric Soils (NTCSH).
Anonymous (2006) Erratta "Field Indicators of Hydric Soils in the United States, A Guide for Identifying and Delineating Hydric Soils, Version 6.0" U.S. Army Corps of Engineers (G.W. Hurt et al. Eds.).
Cooper, D.C. et al. (2006) "Interactions between Microbial Ion Reduction and Metal Geochemistry: Effect of Redox Cycling on Transition Metal Speciation in Iron Bearing Sediments," Environ. Sci. Technol. 40:1884-1891.
Rabenhorst, M.C. et al. (2006) "Reduction of Iron Oxides in Wetland Soils" 18th World Congress of Soil Science, Philadelphia, PA. Jul. 9-15, 2006. Abstracts.
Rabenhorst, M. C. et al. (2006) Synthesized Iron Oxides Used as a Tool for Documenting Reducing Conditions in Soils. 18th World Congress of Soil Science, Philadelphia, PA. Jul. 9-15, 2006 Abstracts.

(Continued)

*Primary Examiner*—Jill Warden
*Assistant Examiner*—Dwan A Gerido
(74) *Attorney, Agent, or Firm*—Jeffrey I. Auerbach; Edell, Shapiro & Finnan, LLC

(57) ABSTRACT

The present invention present invention relates to improved IRIS Fe oxide paint compositions, to the dried (or cured) residue of such paints, and to devices upon which such paint compositions have been applied (IRIS devices) used to assess reducing conditions in soils, especially wetland soils. The improved IRIS Fe oxide paints contain from about 30 to about 70 mole percent goethite, more preferably, from about 40 to about 60 mole percent goethite, and still more preferably, about 50 mole percent goethite.

19 Claims, 17 Drawing Sheets

OTHER PUBLICATIONS

Rabenhorst, M.C. et al. (May 23, 2006) "Synthetic Iron Oxides as an indicator of Reduction in Soils (IRIS)" Soil Sci. Am. J. 70:1227-1236.

Jenkinson, B. et al. (2002) "Soil Hydrology on an End Moraine and a Dissected Till Plain in West-Central Indiana," Soil Sci. Soc. Am. J. 66:1367-1376 (2002).

Jenkinson, B. (2002) "Indicators of Reduction in Soils (IRIS): A Visual Method for the Identification of Hydric Soils," Ph. D. Diss. Purdue Univ., West Lafayette, IN.

Jenkinson, B.J. and Franzmeier, D.P. (2006) "Development and Evaluation of Fe-Coated Tubes That Indicate Reduction in Soils," Soil Sci. Soc. Am. J. 70:183-191.

Castenson, K.L. and Rabenhorst, M.C. (2006) "Indicator of Reduction in Soil (IRIS): Evaluation of a New Approach for Assessing Reduced Conditions in Soil," Soil Sci. Soc. Am. J. 70:1222-1226.

Rabenhorst, M.C. and Castenson, K.L. (2005) "Temperature Effects on Iron Reduction in a Hydric soil," Soil Sci. 170:734-742.

Schwertmann, U. et al. (1983) "Effect of pH on the Formation of Goethite and Hematite from Ferrihydrite," Clays and Clay Minerals 31:277-284.

* cited by examiner

SYNTHETIC IRON OXIDES AND THEIR USE AS AN INDICATOR OF REDUCTION IN SOILS (IRIS)

CROSS-REFERENCE TO RELATED PATENT APPLICATIONS

This application claims priority to U.S. Patent Application Ser. No. 60/743,655, filed on Mar. 22, 2006, which application is herein incorporated by reference in its entirety.

FIELD OF THE INVENTION

The present invention present invention relates to improved IRIS Fe oxide paint compositions, to the dried (or cured) residue of such paints and to devices upon which such paint compositions have been applied (IRIS devices) used to assess reducing conditions in soils especially wetland soils. The improved IRIS Fe oxide paints contain from about 30 to about 70 mole percent goethite, more preferably, from about 40 to about 60 mole percent goethite, and stilt more preferably, about 50 mole percent goethite.

BACKGROUND OF THE INVENTION

Natural wetlands collect and purify surface water before it reaches the streams and aquifers that provide our drinking water. They also serve as habitats for many birds and animals, and they provided areas for recreation. Wetland soils are saturated, flooded or ponded such that they develop reducing conditions. Reducing soil conditions typically lead to distinctive biological communities adapted to life in an anaerobic environment, and also foster the development of particular biogeochemical processes that mays provide environmental benefits.

Wetlands have three essential requirements: hydric soils, hydrophytic vegetation, and wetland hydrology. By definition, hydric soils are those that are saturated, flooded, or ponded long enough during the growing season to develop anaerobic conditions in the upper part. That is, hydric soils have a water table at or near surface for a time long enough during the growing season to become anaerobic. In saturated soils anaerobic microorganisms use compounds such as nitrate, manganese oxides and/or iron oxides as at electron acceptor instead of oxygen in respiration processes. A byproduct of this microbial activity is the increased mobility of Mn and Fe in the soil solution. The saturated conditions of the hydrology factor, the soil oxygen deficiency of the vegetation factor, and the anaerobic conditions of the soil factor are all related (U.S. Pat. No. 6,766,762).

Documentation of reduced soil conditions is needed or desired for a number of purposes. For example, wetland construction or restoration projects associated with mitigation efforts usually have hydrological performance standards, but there is an increasing demand for standards linked to wetland function such as demonstrating that soil conditions are reducing. There are also numerous applications linked to hydric soil assessment and the Technical Standard (TS) for Hydric Soils. The TS requires a demonstration both that the soil is saturated and reduced (National Technical Committee for Hydric Soils (2000) Technical Note 11: Technical Standards for Hydric Soils). In the evaluation or testing of Field Indicators of Hydric Soils (USDA-NRCS (2006) FIELD INDICATORS OF HYDRIC SOILS IN THE UNITED STATES, Ver 6.0 (G. W. Hurt et al. (Eds.)) USDA, NRCS, Fort Worth, Tex.), the TS must be met. In cases where a soil does not meet a field indicator, the TS can be used to demonstrate that a soil is hydric. In these situations the soil must be shown to be reducing.

The generally accepted approach to demonstrate reducing conditions in soils is either: (1) to measure the redox potential using Pt electrodes and show that data plot in the "reducing" zone in an Eh-pH diagram or (2) to apply $\alpha,\alpha$ dipyridyl to the soil and observe a positive test (pink color) for ferrous iron. Both of these approaches have limitations due to either the need for specialized equipment or the difficulty in obtaining the necessary chemicals. These limitations have led to recent interest in "IRIS" ("Indicator of Reduction In Soil") tubes as an alternate approach for confirming reducing conditions in soils (U.S. Pat. No. 6,766,762; Jenkinson, B. et al. (2002) "Soil Hydrology on an End Moraine and a Dissected Drill Plain in West-Central Indiana," Soil Sci. Soc. Am. J. 66:1367-1376 (2002), Jenkinson, B. (2002) "Indicators of Reduction in Soils (IRIS): Visual Method for the Identification of Hydric Soils," Ph.D. Diss. Purdue Univ. West Lafayette, Ind.; Castenson, K. L. (2004) "Hydromorphology of Piedmont Floodplain Soils," M.S. Thesis. Univ. of Maryland, College Park; Jenkinson B. J. and Franzmeier. D. P. (2006) "Development and Evaluation of Fe-Coated Tubes That Indicate Reduction in Soils," Soil Sci. Soc. Am. J. 70:183-191; Castenson, K. L. and Rabenhorst, M. C. (2006) "Indicator of Reduction in Soil (IRIS): Evaluation of a New Approach for Assessing Reduced Conditions in Soil," Soil Sci. Soc. Am. J. 70:1222-1226, Rabenhorst, M. C. and Castenson, K. L. (2005) "Temperature Effects on Iron Reduction in a Hydric soil," Soil Sci. 170:734-742 ). The basic concept of this approach is that a synthetic iron oxide paint is applied to PVC tubes (approx. 21 mm dia.) which are then inserted into the soil. Under wetland conditions, actively respiring microorganisms transfer electrons to the thin coating of iron oxides on the tube, causing the iron to become reduced and soluble, leaving portions of the white tube uncoated. The degree to which the tubes become stripped of the iron oxide paint is an indication of the degree to which microorganisms were using the iron oxides as an alternate electron acceptor.

U.S. Pat. No. 6,766,762, and Jenkinson, B. (2002) ("Indicators of Reduction in Soils (IRIS): A Visual Method for the Identification of Hydric Soils," Ph.D. Diss. Purdue Univ. West Lafayette, Ind.) give considerable attention to the construction of the tubes themselves as well as some discussion of the nature of the employed paint used to prepare the tubes. Relatively little attention, however, has been given to the mineralogical nature of the paint. Incidental observations have revealed that the disclosed paints provide undesirable adhesion and durability, thus limiting the approach of using IRIS Fe oxide paints.

Thus, despite the above-described efforts, a need remains for an IRIS Fe oxide paint having desirable adhesion and durability. The present invention is directed to this and other goals.

SUMMARY OF THE INVENTION

The present invention present inventions relates to improved IRIS Fe oxide paint compositions, to the dried (or cured) residue of such paints, and to devices upon which such paint compositions have been applied (IRIS devices) used to assess reducing, conditions in soils, especially wetland soils. The improved IRIS Fe oxide paints contain from about 30 to about 70 mole percent goethite, more preferably from about 40 to about 60 mole percent goethite, and still more preferably about 50 mole percent goethite.

Various circumstances in wetland delineation or mitigation strategies require the documentation of reducing conditions in soils. An innovative approach for assessing reduction in soils known as "Indicator of Reduction in Soils" (IRIS) has been recently introduced. IRIS tubes are manufactured by coating a material, typically PVC pipe, with an "IRIS Fe oxide paint" prepared from an Fe oxide (mainly ferrihydrite) suspension. When the iron oxide is synthesized by adding KOH to a $FeCl_3$ solution, the mineral phase is essentially pure ferrihydrite. Such Fe oxide paints showed poor adhesion and durability. Over time, and under particular conditions, the ferrihydrite is transferred to more crystalline forms such as goethite and hematite.

The present invention derives, in part, from studies of the importance of the mineralogical nature of the paint, both in regard to its function and to its properties, which affect fabrication or construction of the IRIS devices. These studies assessed the mineralogical composition of iron oxide paint synthesized for the manufacture of IRIS tubes for documenting reduced soil conditions, and the significance of mineralogical composition of the Fe oxide paint on desirable qualities for the construction of IRIS tubes. As a consequence of such efforts, an improved IRIS Fe oxide paint which contains from about 30% to about 70% goethite was identified. The improved IRIS Fe oxide paint exhibits improved adhesion and durability.

Production of the improved IRIS Fe oxide paint of the present invention can be facilitated during synthesis by titrating the Fe oxide suspension to a pH of 11-12, rather than pH 7.5, which has typically been prescribed for the formation of synthetic ferrihydrite. The invention derives in part from studies conducted to assess the mineralogical composition of iron oxide paint synthesized for the manufacture of IRIS tubes, and assess the significance of mineralogical composition of the Fe oxide paint on desirable qualities for the construction of IRIS tubes. These studies examined the effects of pH and storage time on the mineralogical alteration of ferrihydrite and compared these properties with the performance of the paint using a scale for adhesion and durability.

In detail, the invention provides an IRIS Fe oxide paint, the paint comprising a liquid composition comprising iron oxide, the iron oxide comprising from about 30 to about 70 mole percent goethite, more preferably, wherein the iron oxide comprises from about 40 to about 60 mole percent goethite, and still more preferably, wherein the iron oxide comprises about 50 mole percent goethite.

The invention also provides a solid support having a coating comprising a dried residue of an IRIS Fe oxide liquid paint composition, wherein the iron oxide of the IRIS the oxide paint comprises iron oxide, the iron oxide comprising from about 30 to about 70 mole percent goethite, more preferably, wherein the iron oxide comprises from about 40 to about 60 mole percent goethite, still more preferably, wherein the iron oxide comprises about 50 mole percent goethite. The invention particularly concerns the embodiment wherein the solid support is polyvinyl chloride, especially a polyvinyl chloride tube.

The invention also concerns a method of improving the adhesion and durability of an IRIS Fe oxide paint, which comprises the steps:
(A) titrating (i) an IRIS Fe oxide paint solution containing a water soluble Fe(III) salt with (ii) a base, to a pH greater than 9; and
(B) permitting conversion of the iron oxide to from about 30 to about 70 mole percent goethite;
wherein the presence of the goethite improves the adhesion and durability of the IRIS Fe oxide paint.

The invention also concerns the embodiments of such method wherein the IRIS Fe oxide paint solution is titrated to a pH greater than 11, and/or wherein the Fe oxide in the IRIS Fe oxide paint solution is converted from about 40 to about 60 mole percent goethite, and/or wherein the Fe oxide in the IRIS Fe oxide paint solution is converted to about 50 mole percent goethite.

The invention also provides a method of evaluating the reduction state of soil, which comprises measuring a change in the coloration of a support that comprises a coating of dried residue of an IRIS Fe oxide paint, wherein the iron oxide of the paint comprises from about 30 to about 70 mole percent goethite, and more preferably from about 40 to about 60 mole percent goethite, and still more preferably, wherein the iron oxide comprises about 50 mole percent goethite.

The invention particularly concerns the embodiments of all such methods wherein the soil is a hydric soil, a wetlands soil or a soil of an estaurine system.

The invention particularly concerns the embodiments of all such methods wherein the method evaluates dissolved sulfide.

DESCRIPTION OF PREFERRED EMBODIMENTS OF THE INVENTION

Figure 1:
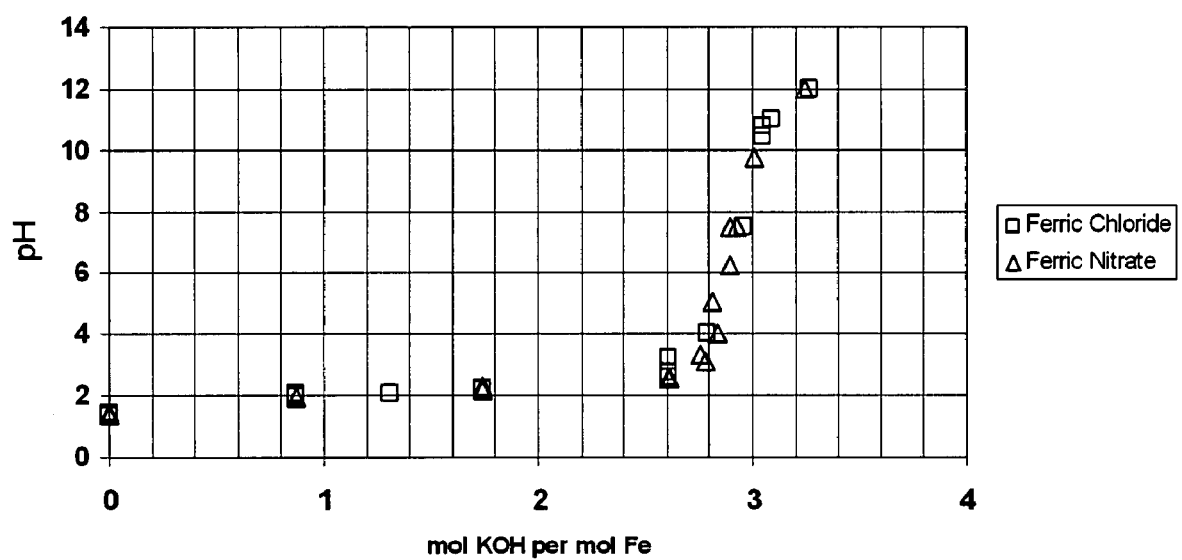
FIG. 1 shows a titration curve of pH versus quantity of base added per mol of ferric salt. Note that both chloride and nitrate salts behave identically.

The present invention relates to improved IRIS Fe oxide paint compositions, to the dried (or cured) residue of stick paints and to devices upon which such paint compositions have been applied (IRIS devices used to assess reducing conditions in soils especially wetland soils. The improved IRIS Fe oxide paints contain from about 30% to about 70% goethite, more preferably from about 30% to about 60% goethite, and still more preferably from about 40% to about 60% goethite, and most preferably about 50% goethite (all percentages are mole percentages).

The IRIS FE Oxide Paints of the Present Invention

As used herein, the term "IRIS Fe oxide paint" denotes a liquid composition comprising iron oxide in which the iron oxide comprises from about 30% to about 70% goethite, more preferably from about 30% to about 60% goethite, and still more preferably from about 40% to about 60% goethite, and most preferably about 50% goethite (all percentages are mole percentages) and the residual being Fe oxides, such as ferrihyrite. Goethite is an iron oxide-hydroxide having the empirical formula: $Fe^{(+3)}O(OH)$. It has a yellowish-brown color, and forms orthorhombic dipyramidal crystals having 3 two-fold axes of symmetry (Hermann-Maugin Symbols: 2/m 2/m 2/m). Ferrihydrite is an iron oxyhydroxide with the empircal formula: $Fe^{3+}{}_5HO_8 \cdot 0.5(H_2O)$. It has a reddish-brown to dark brown color, and forms trigonal-hexagonal crystals having 3 two-fold axes of symmetry and 1 three-fold axis of symmetry (Hermann-Maugin Symbols: $\bar{3}$ 2/m).

The IRIS Fe oxide paints of the present invention are preferably formed following procedures outlined in Rabenhorst, M. C. and Burch S. N. (2006) ("Synthetic Iron Oxides as an Indicator of Reduction in Soils (IRIS)," Soil Sci. Soc. Am. J. 70:1227-1236). Thus, a water soluble Fe(III) salt (e.g., $FeCl_3$; $FeI_3$; $FeBr_3$; $Fe(NO_3)_3$, $Fe_2(SO_4)_3$, etc. is introduced into an aqueous solution (for example, at 0.05 M to 1 M, and more preferably, at 0.1 M-0.5 M, and most preferably at about 0.2 M) and tritrated with a base (e.g., KOH, NaOH, $NH_4OH$, etc.) to a pH greater than 7.5, more preferably greater than 9, still more preferably greater than 10, and most preferably to a pH value of between about 11 and about 12. The concentration of base is preferably 2, more preferably 5, 10 or more, times the molar equivalent of the Fe(III) salt in the solution (i.e., for 0.2 M $FeCl_3$, tritration may be accomplished with 1 M KOH). However, the concentration of base is not critical, and other ratios of base to Fe(III), salt can be employed. Such titration yields a ferrihydrite-rich suspension. The Fe oxide of the suspension is then converted to the desired concentration (e.g., between about 30% to about 70%) of goethite. Such conversion may be accomplished by merely allowing the spontaneous conversion of the ferrihydrite into goethite (as by storage of the suspension at 20° C. until the desired goethite concentration has been attained (e.g., for several days or weeks). The process can be accelerated by incubation at higher temperatures (e.g. 35° C.) or, if desired, can be decelerated by incubation at lower temperatures (e.g. 6° C.). Initially one may desire to accelerate the transformation, and then after it reaches the desired composition, refrigerate it in order to maintain and extend the shelf life of the preparation (see, FIG. 12).

The IRIS Supports of the Present Invention

Ferrihydrite is substantially insoluble in soil conditions having free access to oxygen. However, when exposed to sustained anaerobic conditions, the ferrihydrite coating is dissolved (Cooper, D. C. et al. (2006) "Interactions between Microbial Iron Reduction and Metal Geochemistry: Effect of Redox Cycling on Transition Metal Speciation in Iron Bearing Sediments," Environ. Sci. Technol. 40:1884-1891; U.S. Pat. No. 6,766,762)) leading to a loss of intensity of the yellow-brown coloration of the IRIS coating and thus indicating the presence of reducing conditions in the soil. Thus, the IRIS FE oxide paints of the present invention are preferably applied to a solid support for use in determining reducing conditions in soil. Such supports may be composed of any of a wide variety of materials (e.g., glass, plastic, paper, stone, ceramic, etc.). It is preferred to employ supports of polyvinyl chloride (PVC), since such supports are strong, light weight, inexpensive, resistant to elemental damage, and white (thereby providing a high contrast surface that facilitates the determination of color change). Although the supports may be fashioned in any of a variety of geometries (planks, stakes, tubes, etc.), the use of tubular supports is preferred.

The IRIS Fe oxide paints of the present invention may be applied to such support using for example, a cloth applicator, a brush (a bristle brush, or more preferably a foam brush). Application, particularly on cylindrical supports is facilitated though the use of a lathe-like device that can be used to slowly rotate the surface and thereby facilitate an even coating. After application, the coatings are preferably permitted to dry or cure (e.g. for 24 hrs, in air and it room temperature, or via applied heat, such as with a heated blow dryer).

The IRIS Fe oxide paints and IRIS supports of the present invention may be used to assess the reducing conditions in soils, particularly wetlands soils. The IRIS Fe oxide paints and IRIS supports of the present invention may also be used to investigate the depth or extent of such reducing conditions, or to identify failed septic systems, or to analyze soil organic carbon content.

Having now generally described the invention, the same will be more readily understood through reference to the following examples, which are provided by way of illustration and are not intended to be limiting of the present invention unless specified.

EXAMPLE 1

IRIS Tube Construction and Ferrihydrite IRIS Fe Oxide Paint Synthesis

In the method of Jenkinson (Jenkinson, B, (2002) ("Indicators of Reduction in Soils (IRIS): A Visual Method for the Identification of Hydric Soils," Ph.D. Diss. Purdue Univ., West Lafayette, Ind.), IRIS tubes are prepared by applying an iron oxide paint to lengths of PVC pipe that are approximately 21 mm in diameter (typically ½ inch schedule 40 PVC pipe). The iron oxide (mainly ferrihydrite) is precipitated from a 0.5 M ferric chloride solution by adding 1 M KOH until a pH of 7 to 8 is reached. This is a slight modification from the procedure of Schwertmann, U. and, Cornell, R. M. (2000) (IRON OXIDES IN THE LABORATORY: PREPARATION AND CHARACTERIZATION, 2nd Edition, Wiley, New York) for the synthesis of 2-line ferrihydrite, wherein they prescribe addition of 330 mL of 1 M KOH to 0.5 L of 0.2 M ferric nitrate to reach the same pH of between 7 and 8. Excess salts are then removed by centrifugation and dialysis and the suspension is evaporated to the appropriate consistency for applying to the tubes. The paint is stored in the dark to minimize mineralogical alteration over time.

Repeated testing, however, led to the observation that the IRIS paint compositions produced using the method of Jenkinson exhibited a dull luster and did not adhere well to PVC tubes, even after thorough cleaning and sanding. Eventually, it was recognized that the use of newly synthesized paint always exhibited these characteristics. However, if one waited a few weeks before using the paint, the paints sometimes had a shinier luster and adhered better to the tubing. It was therefore postulated that this improvement was the result of mineralogical alterations occurring in the Fe oxide suspensions over time as they were being stored. A detailed investigation was therefore conducted to explore the effect of pH and storage on the mineralogy of the paints.

Experimentation on pH and Storage Time Effects

Suspensions of ferrihydrite were prepared following the specifications of Schwertmann, U. and Cornell, R. M. (2000) (IRON OXIDES IN THE LABORATORY: PREPARATION AND CHARACTERIZATION, 2nd Edition, Wiley, New York) and Jenkinson, B. (2002) ("Indicators of Reduction in Soils (IRIS): A Visual Method for the Identification of Hydric Soils," Ph. D. Diss. Purdue Univ., West Lafayette, Ind.) by titrating 0.5 M solutions of $FeCl_3$ or $Fe(NO_3)_3$ to pH 7.5 using 1 M KOH. After centrifugation and dialysis, suspensions were stored in the dark. Approximately 30-40 mL of the suspensions was removed and, after periods of 4, 7, 14, 21, 28, 42, or 56 days, immediately freeze-dried. Because it has been reported that the storage pH of a ferrihydrite suspension affects the degree to which it is transformed to more thermodynamically stable species (Schwertmann, U. and, Cornell, R. M. (2000) (IRON OXIDES IN THE LABORATORY: PREPARATION AND CHARACTERIZATION, 2nd Edition, Wiley, New York; Cornell, R. M. and Schwertmann, U. (2003) THE IRON OXIDES: STRUCTURE, PROPERTIES, REACTIONS, OCCURRENCES, AND USES $2^{nd}$ Edition, Wiley-VCH GmbH & Co. KGaA, Weinheim, FRG), suspensions of ferrihydrite were also synthesized by titrating 0.5 M solutions of $FeCl_3$ or $Fe(NO_3)_3$ to pH values of 4.0, 11.0 or 12.0 using 1 M KOH. These suspensions were also treated, stored, and sampled as described above. The pH titration curves for both the chloride and nitrate salts were found to be nearly identical (FIG. 1). The ferrihydrite typically began to precipitate around pH 4, where the titration curve becomes very steep. One can also see from FIG. 1 that the target pH values of 4.0, 7.5, 11.0 and 12.0 are all along the steep portion of the titration curve. Thus, the quantity of base added to move between pH 4.0, 7.5, 11.0, and 12.0 was approximately 0.12, 0.15, and 0.25 mols per mol Fe, respectively, which represents a relatively small portion of the approximately 3.5 mol of base added per mol Fe. Total Fe was extracted from duplicate 50 mg samples using 6M HCl, and acid ammonium oxalate extractions were made in the dark using duplicate 50 mg samples and 100 mL of $(NH_4)_2C_2O_4$ adjusted to pH 3. Mineralogy of the samples was evaluated using XRD.

Following periods of 4, 7, 14, 21, 42, and 56 days, each of the synthesized paint samples was applied to a section of PVC tubing using a soft foam brush while the PVC tube was being rotated using a lathe-like device (in the manner normally used in constructing IRIS tubes). After drying for 24 hrs, the durability and adhesion of the paint to the PVC tubing was evaluated by wiping one's index finger a single time along a portion of the painted and dried tube, and using the following numerical scale from 1 to 5 (i.e., 1—paint wipes off when applying very slight pressure; 2—paint wipes off when applying slight pressure; 3—paint wipes off when applying moderate pressure; 4—paint wipes off only when applying firm pressure; 5—paint does not wipe off when applying firm pressure).

Mineral Transformations Induced by pH and Storage Time

Figure 2:
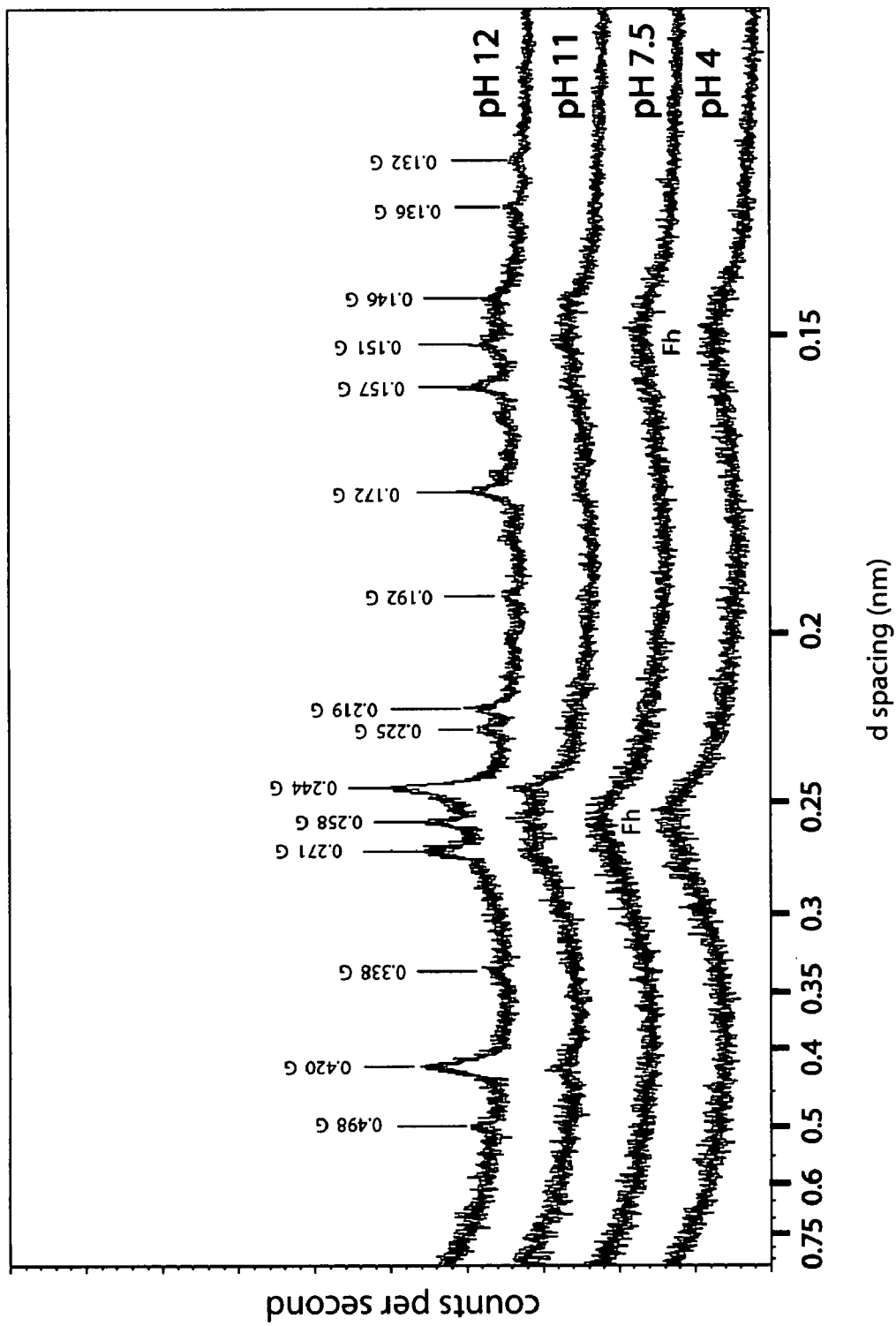
FIG. 2 shows x-ray diffractograms of synthetic Fe oxides 4 day old, formed by titration of Fe(III) chloride with KOH to pH values of 4, 7.5, 11, and 12. Note two broad peaks for ferrihydrite (Fh) at 0.26 and 0.15 nm, and goethite (G) peaks are more pronounced in iron oxides formed at higher pH.
Figure 3:
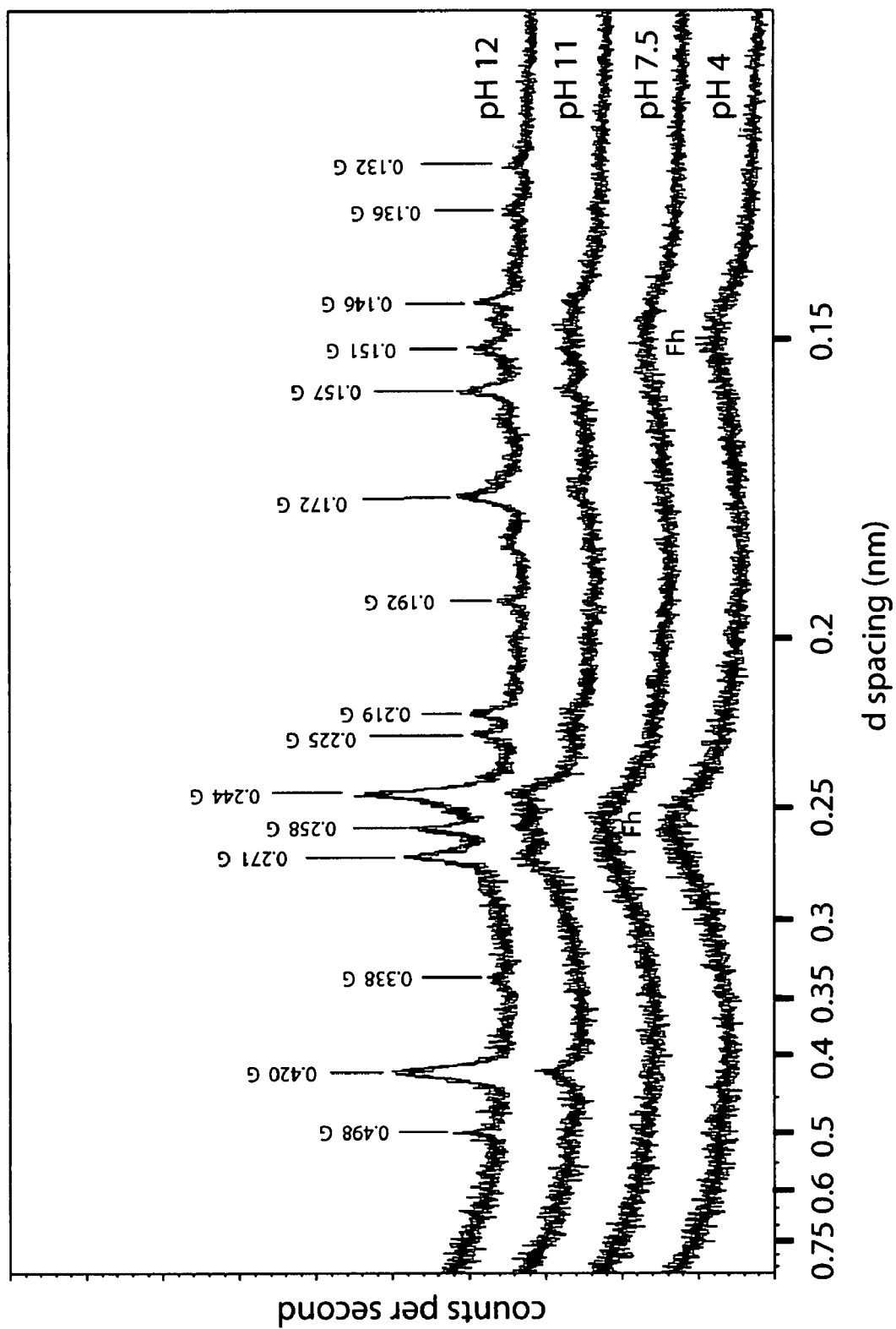
FIG. 3 shows x-ray diffractograms of synthetic Fe oxides 7 day old, formed by titration of Fe(III) chloride with KOH to pH values of 4, 7.5, 11, and 12. Note two broad peaks for ferrihydrite (Fh) at 0.26 and 0.15 nm, and goethite (G) peaks.
Figure 4:
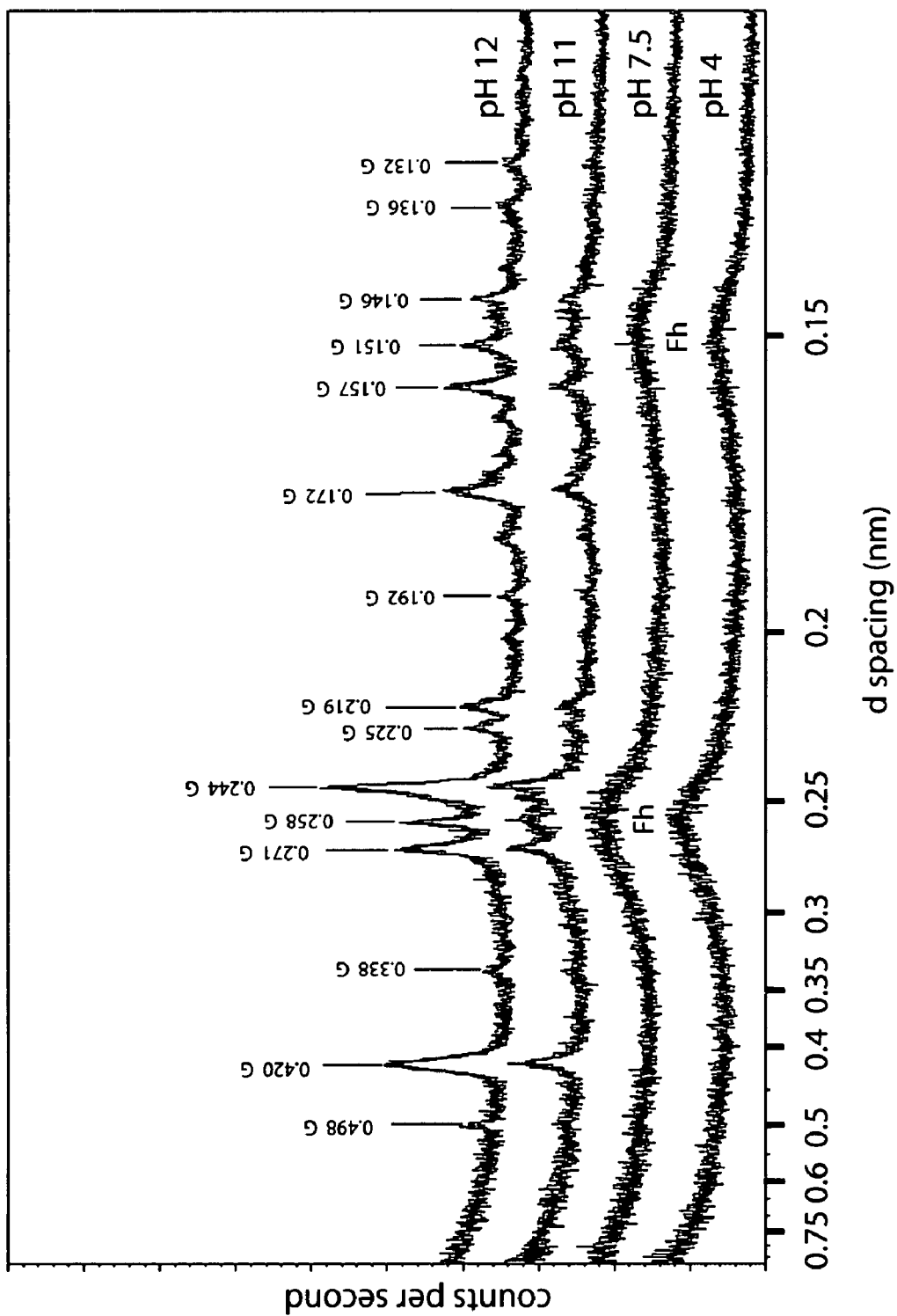
FIG. 4 shows x-ray diffractograms of synthetic Fe oxides 14 day old, formed by titration of Fe(III) chloride with KOH to pH values of 4, 7.5, 11, and 12. Note two broad peaks for ferrihydrite (Fh) at 0.26 and 0.15 nm, and goethite (G) peaks.
Figure 5:
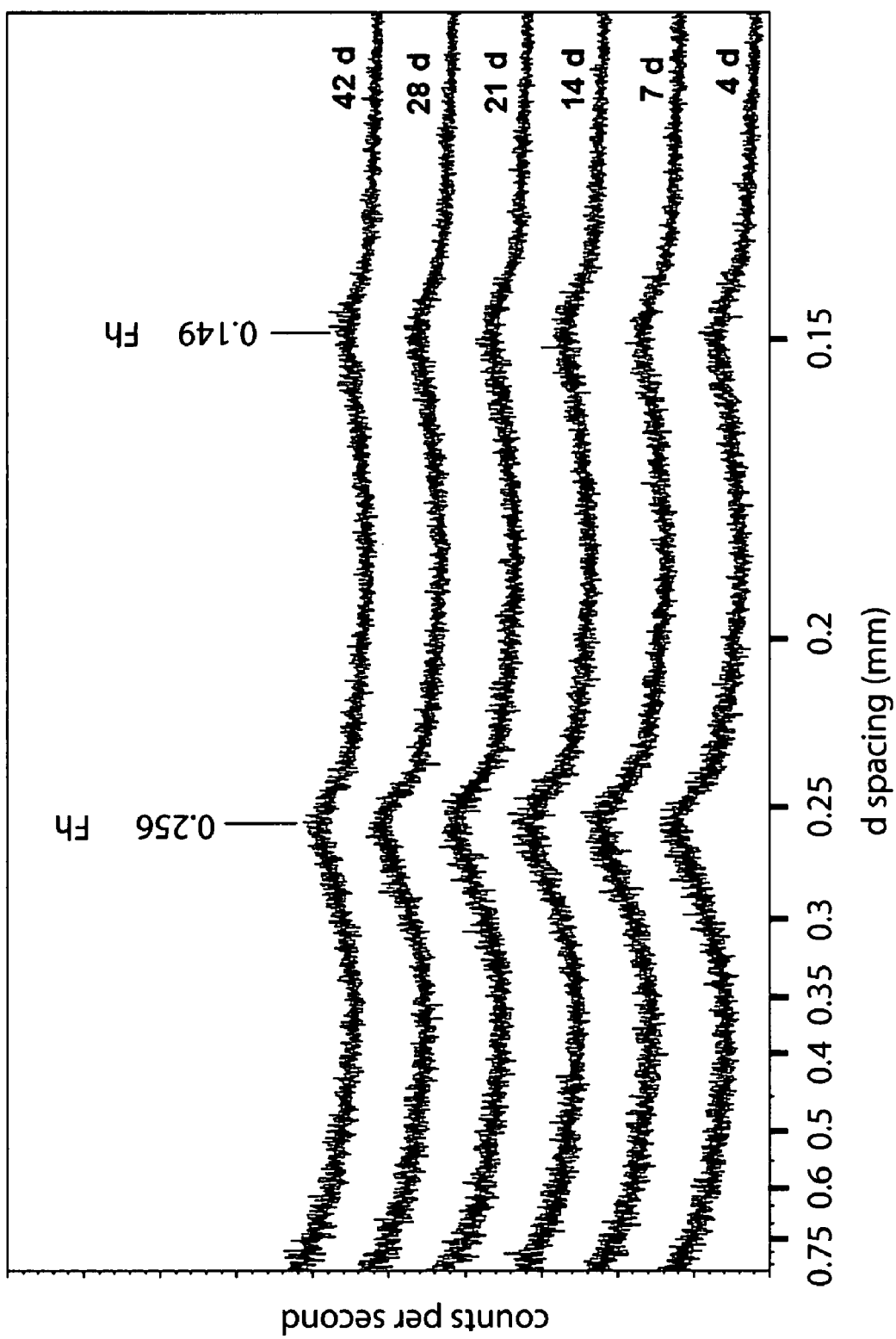
FIG. 5 shows x-ray diffractograms of synthetic Fe oxides of various ages (4 to 42 day), formed by titration of Fe(III) chloride with KOH to pH values of 7.5. Only two broad peaks for 2-line ferrihydrite (Fh) are observed.
Figure 6:
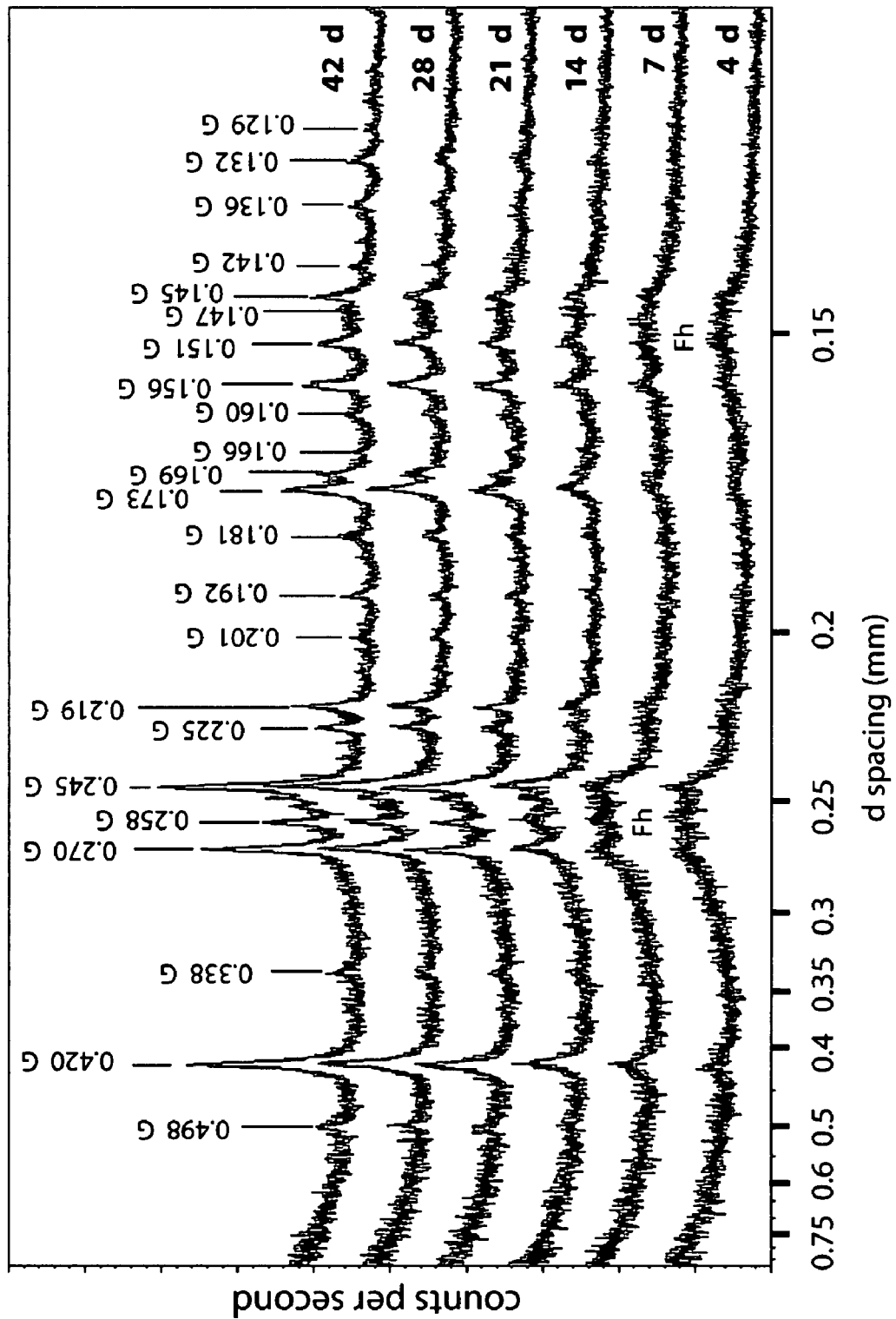
FIG. 6 shows x-ray diffractograms of synthetic Fe oxides of various ages (4 to 42 d), formed by titration of Fe(III) chloride KOH to a pH value of 11. Note goethite (G) peaks become more pronounced over time.
Figure 7:
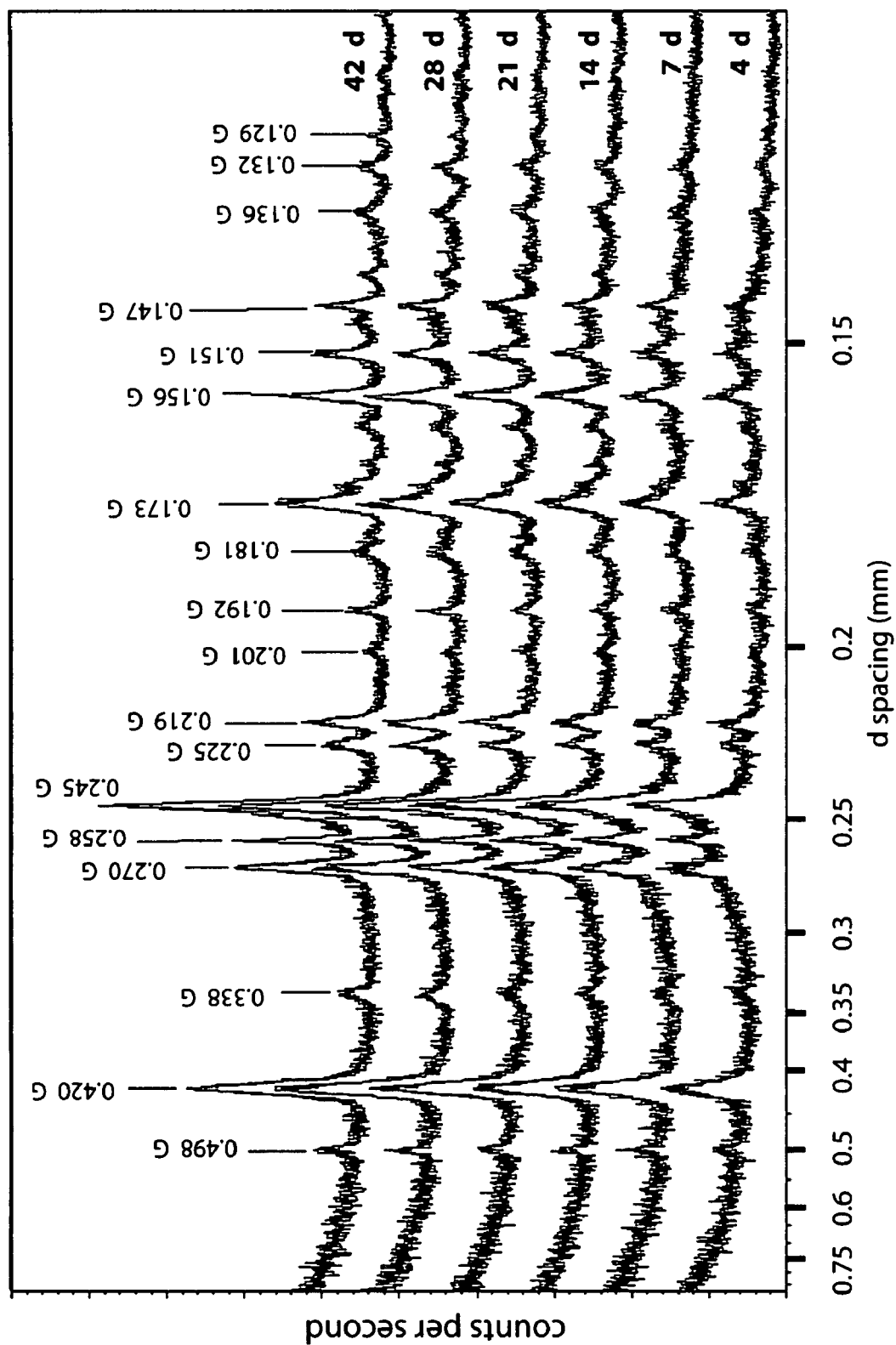
FIG. 7 shows x-ray diffractograms of synthetic Fe oxides of various ages (4 to 42 d), formed by titration of Fe(III) chloride KOH to a pH value of 12. Note goethite (G) peaks become more pronounced over time.

In the experiment examining titration pH and storage time, iron oxides formed from the chloride and nitrate salts appeared to be nearly identical. FIG. 2 shows the x-ray diffractograms for the iron oxides formed by titrating to pH values between 4 and 12, immediately after dialysis was completed, which was four days following their initial precipitation. Iron oxides formed at Ph 4 and 7.5 show the two broad peaks characteristic of 2-line ferrihydrite. The formation of goethite was apparently favored by the titration to higher pH values of 11 and then to 12 (as shown by stronger goethite peaks). As the iron oxide suspensions age to seven and 14 days, those titrated to pH 4 and to pH 7.5 show no evidence of changing to more crystalline phases, but those titrated to pH 11 and to pH 12 show an increased intensity of the goethite peaks (FIG. 3 and FIG. 4). This trend appears to continue through a period of at least 42 days. X-ray diffractograms of iron oxides titrated to pH 4 and pH 7.5 show no evidence of goethite formation, while those formed by titrating to pH 11 or to pH 12 show evidence of continually increasing alteration of ferrihydrite to form goethite (FIG. 5, FIG. 6 and FIG. 7).

Figure 8:
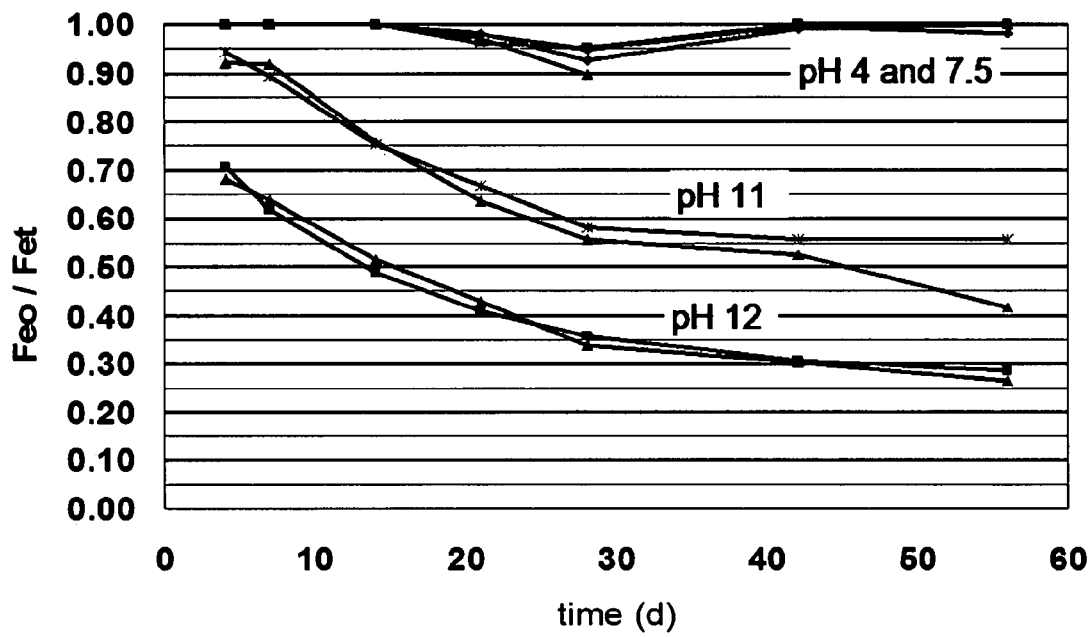
FIG. 8 shows the ratio of oxalate extractable Fe ($Fe_o$) to total extractable Fe ($Fe_t$) in synthetic Fe oxides formed by titrating to four pH values (4, 7.5, 11, and 12) and stored as aqueous suspensions in the dark over a period of 56 days. Note the similarity of $Fe_o/Fe_t$ for iron oxides synthesized at pH 4 and pH 7.5 and that $Fe_o/Fe_t$ ratio is very near to 1.0. Pairs of lines represent oxides synthesized from chloride and nitrate salts.

The ratio of oxalate extractable iron to total iron (Feo/Fet) confirms more quantitatively what was observed qualitatively by XRD. The iron oxide formed by titration to pH 4 and pH 7.5 is entirely oxalate extractable, indicating that it is pure ferrihydrite (FIG. 8). When these materials are stored in an aqueous suspension, they remain largely unaltered as poorly crystalline ferrihydrite for at least 56 days. Other ferrihydrite samples synthesized in essentially the same manner have remained in aqueous solutions for up to 80 days without showing alteration goethite. The iron oxides formed by titrating to pH 11 and pH 12 after 4 days are about 93% and 70% oxalate extractable, respectively (FIG. 8). The proportion of oxalate extractable iron continues to decrease logarithmically for these two materials so that after 56 days, the proportion of oxalate extractable iron is approximately 50% and 30%, respectively. This corresponds directly to the increase in the size of the goethite peaks it the XRD patterns (FIG. 6 and FIG. 7).

Figure 9:
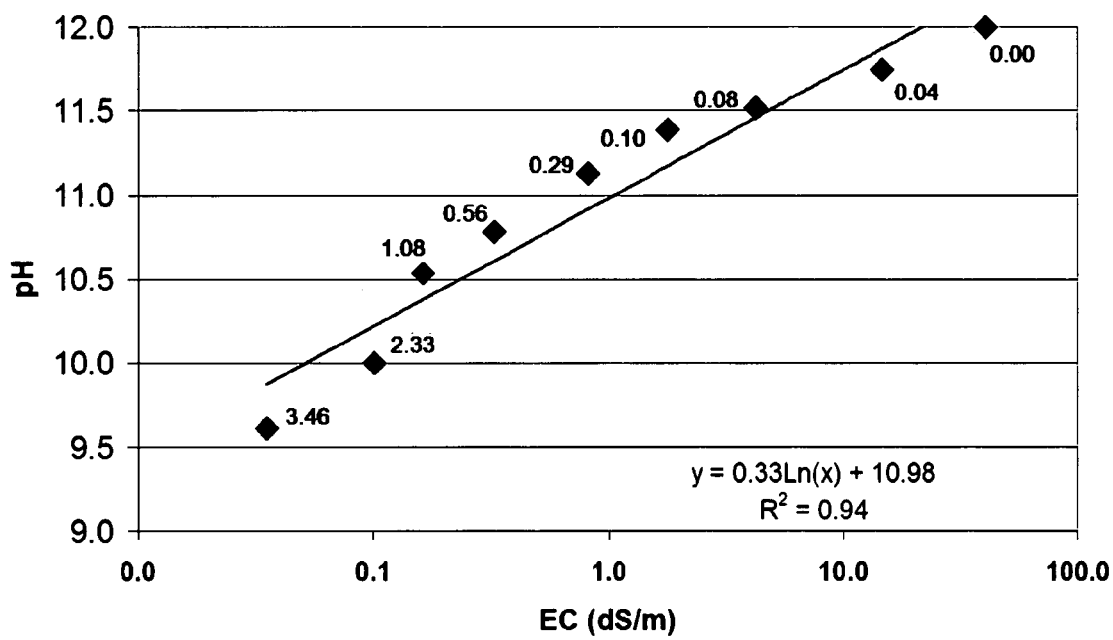
FIG. 9 shows the change in pH of synthetic Fe oxide suspensions (formed by titration to pH 12) as affected by removal of salts by centrifuge washing and dialysis over a period of three and a half days. Values by points are time (d) following original synthesis.
Figure 10:
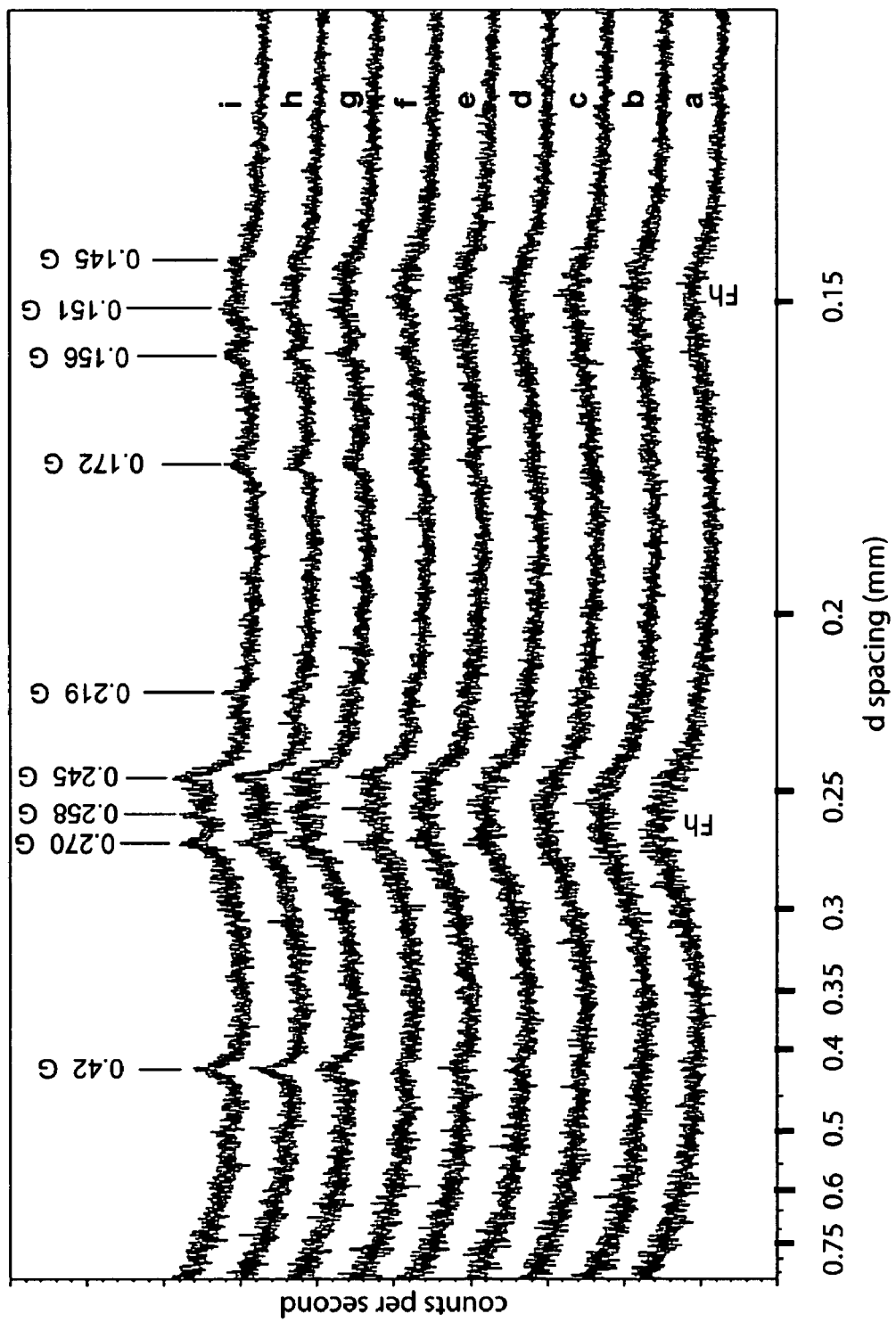
FIG. 10 shows x-ray diffractograms of synthetic Fe oxides sampled over a three and a half day period while salts were being removed by centrifuge washing and dialysis. Letters correspond to column 2 in Table 1. Goethite (G) peaks first begin to become visible in x-ray diffractograms (XRD) scans d and e. Broad ferrihydrite (Fh) peaks are evident at 0.26 and 0.15 nm.
Figure 11:
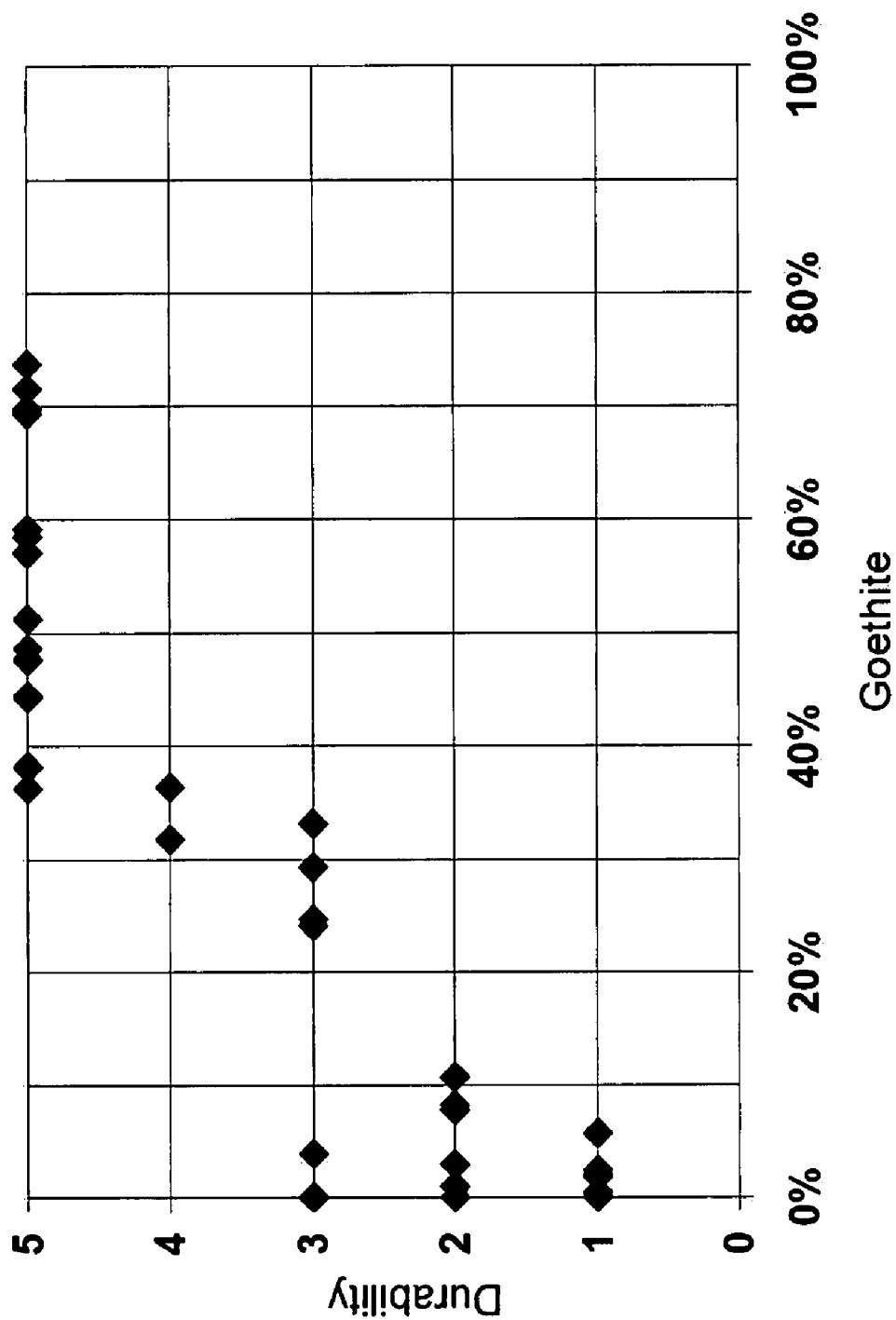
FIG. 11 shows the durability of preferred IRIS Fe oxide paints the present invention when applied to IRIS tubes as a function of goethite content. A minimum of 30 to 40% goethite is necessary for painted tubes to have a durability index of five.

Although Fe oxides were synthesized by titrating to a particular pH (such as 12.0), we expected that during the process of removing salts, the pH would likely change. In order to document this change, an additional sample of ferrihydrite formed by titrating to pH 12 as monitored for changes in pH associated with removal of salts over the course of several days following synthesis (Table 1). During the three days of centrifuge washing and dialysis, the pH decreased directly with the log of EC (FIG. 9) and then when dialysis was completed, appeared to stabilize at approximately pH 9.5. X-ray diffractograms illustrate that approximately 1 to 2 days following synthesis, during dialysis, goethite begins to become visible (FIG. 10 and Table 1).

oxide suspensions) adhered well to the tubing and were resistant to abrasion, while others were easily rubbed off during normal handling. Each of the IRIS Fe oxide paints were evaluated and rated using a scale of 1 to 5 as explained earlier. These data are presented in FIG. 11, where the X axis approximates the proportion of goethite (non-oxalate extractable) in the sample. It appears that in order for the iron oxide paint to have good adhesion properties, it must contain a minimum of about 30% (mole percent) % goethite. Mole percentage is calculated as the amount of Fe that is not extracted by acid ammonium oxalate treatment of the material (4 hrs in the dark) divided by the total Fe extracted by treatment with 6M HCl. This corresponds fairly well with Castenson, K. L. (2004) ("Hydromorphology of Piedmont Floodplain Soils," M. S. Thesis Univ. of Maryland, College Park), who reported that paint used therein for the construction of IRIS tubes contained about 30% iron oxides that were not oxalate extractable. Four additional paint samples that had been synthesized by titrating to pH 7.5, and which ranged in age from 61 to 82 days were evaluated and found to have poor durability with values between 1 and 2.

Schwertmann, U. and Taylor, R. M. (1989) ("Iron Oxides," In: MINERALS IN SOIL ENVIRONMENTS (J. B. Dixon and S. B. Weed (eds.)) $2^{nd}$ Edition. Book Series #1 Soil Science Society of America, Madison, Wis., pp 379-438) have shown that ferrihydrite is reduced more easily than goethite or hematite. Thus ferrihydrite may more closely approximate newly formed iron oxides in the soil, especially in wetland soils that often pass through alternately reducing and oxidizing condition. For this reason, ferrihydrite is a good choice for use in the construction of IRIS tubes for assessing reducing conditions in soil. But also, at least 30% goethite is required in the iron oxide paint to ensure proper adhesion to the PVC tubing. In one embodiment, the requisite goethite can be added to a composition of Fe oxide in order to form the IRIS Fe oxide paints of the present invention. Alternatively, the requisite goethite can be obtained from a spontaneous mineralogical transformation of ferrihydrite into goethite. This mineralogical transformation, although a preferred mode of producing

TABLE 1

Electrical Conductivity (EC) And Ph Over Time During Salt Removal In A Ferrihydrite Suspension Synthesized By Titrating To An Initial Ph Of 12.0

| Description of process prior to sampling or measurement | XRD ID[†] | Date (mm/dd/yy) | Time | Age (d) | Suspension pH | EC dS/m |
|---|---|---|---|---|---|---|
| Initiation of titration | | 04/27/2005 | 9:00 AM | | | |
| Completion of titration | | 04/27/2005 | 9:30 AM | 0.00 | 12.00 | 40.5 |
| Centrifuge and Resuspend 1 | | 04/27/2005 | 10:30 AM | 0.04 | 11.75 | 14.7 |
| Centrifuge and Resuspend 2 | | 04/27/2005 | 11:30 AM | 0.08 | 11.52 | 4.26 |
| Centrifuge and Resuspend 3 | a | 04/27/2005 | 12:00 PM | 0.10 | 11.39 | 1.78 |
| After Dialysis 1 | b | 04/27/2005 | 4:30 PM | 0.29 | 11.13 | 0.82 |
| After Dialysis 2 | c | 04/27/2005 | 11:00 PM | 0.56 | 10.78 | 0.33 |
| After Dialysis 3 | d | 04/28/2003 | 11:30 AM | 1.08 | 10.54 | 0.16 |
| After Dialysis 4 | e | 04/29/2005 | 5:30 PM | 2.33 | 10.00 | 0.10 |
| After Dialysis 5 | f | 04/30/2005 | 8:30 PM | 3.46 | 9.61 | 0.04 |
| Stored 2 days after Dialysis #5 | g | 05/02/2005 | 3:00 PM | 5.23 | 9.62 | nd |
| Stored 5 days after Dialysis #5 | h | 05/05/2005 | 9:30 AM | 8.00 | 9.53 | nd |
| Stored 7 days after Dialysis #5 | i | 05/07/2005 | 9:30 AM | 10.00 | nd | nd |

Figure 13:
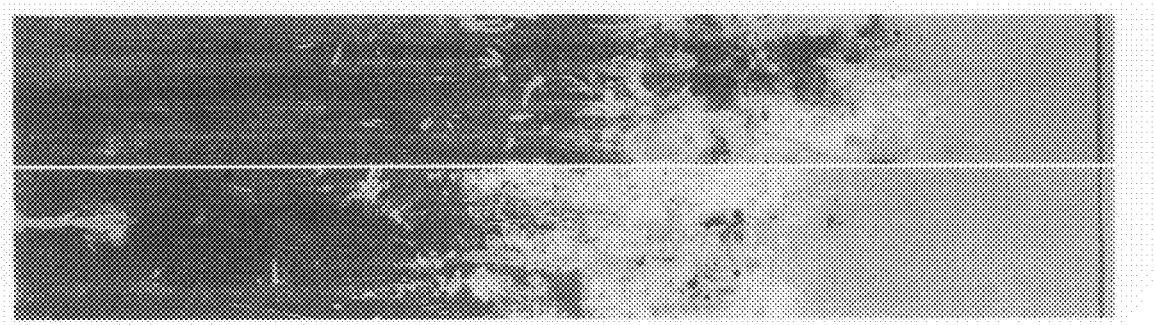
FIG. 13 shows scans to two PVC tubes painted with synthetic iron oxide paint (composed of goethite and ferrihydrite) that had been placed in a tidal marsh for 24 hrs. Black areas show where dissolved sulfide in the pore water reacted with the iron oxide on the tubes to form FeS.

[†]ID corresponds to scans of X-ray diffractograms shown in FIG. 13.
nd = not determined Durability of Fe Oxide Paint on IRIS Tubes When the various suspensions of iron oxides were applied to PVC tubing in the construction of IRIS tubes, their suitability varied widely. Some of the IRIS Fe oxide paints (iron the IRIS Fe oxide paints of the present invention, represents a potential difficulty and source of error if too much of the ferrihydrite is transformed to goethite or hematite, IRIS tubes made using newly formed paint comprised primarily (60-

70%) of ferrihydrite may be expected to perform differently from IRIS tubes made with older paint comprised mainly of goethite or hematite. Therefore a range of 40:60 to 60:40 goethite:ferrihydrite is the preferred target range for the mineralogical composition of the IRIS paint of the present invention. A composition having 50% goethite and approximately 50% other Fe oxides particularly preferred.

In sum, the procedure outlined by Schwertmann, U. and Cornell, R. M. (2000) (IRON OXIDES IN THE LABORATORY: PREPARATION AND CHARACTERIZATION, 2nd Edition, Wiley, New York) for synthesizing ferrihydrite (titrating to pH 7.5) is a good one. Titration to a pH of between 7 and 8 led to the production of pure ferrihydrite, and ferrihydrite made in this manner may remain stable for extended periods of time, even when stored as an aqueous suspension. An IRIS Fe oxide paint composed of a suspension of pure ferrihydrite, however, does not appear to be a good material for coating IRIS tubes because of its poor durability and poor resistance to abrasion.

Figure 12:
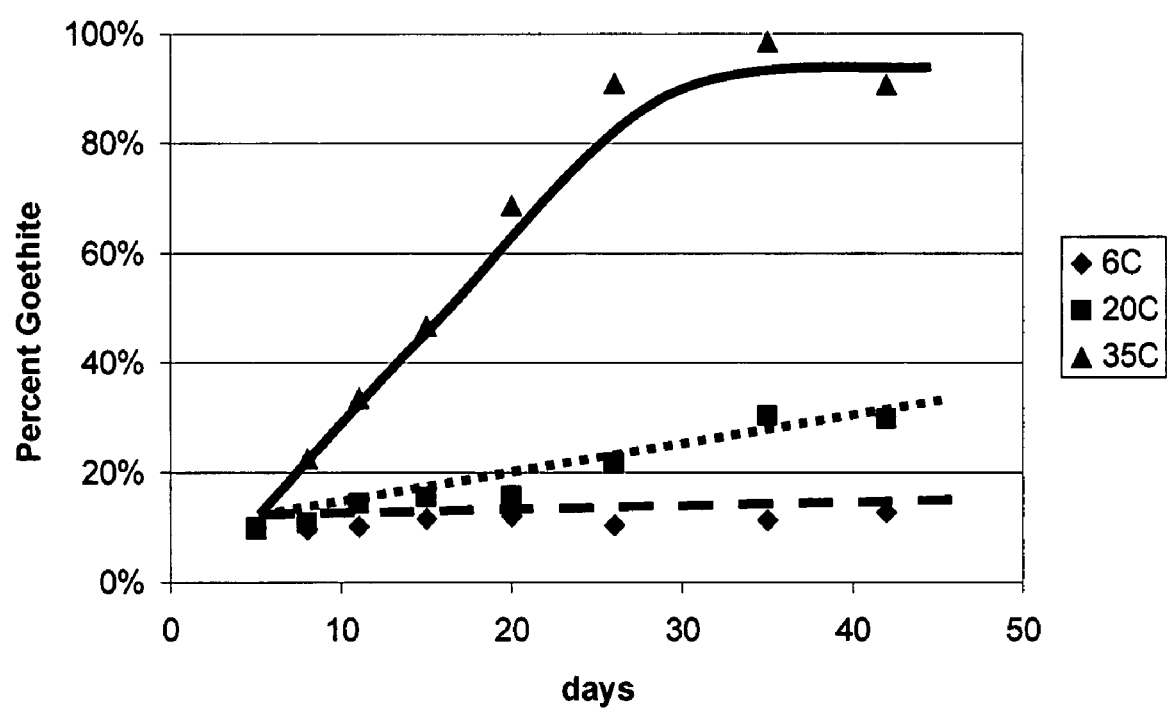
FIG. 12 shows temperature effects on the transformation of ferrihydrite to goethite in iron oxide suspensions (IRIS paint) initially 5% goethite and 95% ferrihydrite. Refrigerated storage at 6° C. dramatically slows down the rate of transformation while incubation at 35° C. significantly increased the rate of transformation.

In order for an IRIS Fe oxide paint to adhere well to the PVC tubing, a minimum of 30 to 40% goethite must be present with the ferrihydrite. This mineralogical composition can be achieved by titrating the initial ferrihydrite suspension to pH 11 and allowing approximately three weeks following initial synthesis for ferrihydrite transformation to goethite. Alternatively, if the ferrihydrite suspension is titrated to pH 12, the necessary mineralogical transformation will occur in approximately one week. Because it is desirable that ferrihydrite remain a dominant phase in the IRIS paint, and because mineralogical alterations of ferrihydrite to goethite continue over time, these paints will likely have a limited shelf life. Based upon the presented data (FIG. 8), an IRIS Fe oxide paint formed by titrating to pH 12 will probably have a relatively short useful shelf life of one to two weeks. After the required aging period of approximately three weeks, paint formed by titrating to pH 11 will apparently have a substantially longer shelf life of three to four additional weeks before goethite begins to become the dominant Fe oxide phase present. Paint that is synthesized by titrating to pH 7.5 will remain nearly pure ferrihydrite and will not have adequate adhesion and durability for use in constructing IRIS tubes. In order to lengthen the useful "shelf life" of the paint, once it has reached the desired 40% goethite, it can be refrigerated which will slow down the continuing transformation of ferrihydrite to goethite (FIG. 12).

EXAMPLE 3

Use of Synthetic IRIS Fe Oxide Paint to Study Biogeochemistry of Soils

A specially formulated suspension of synthetic iron oxides composed of a mixture of approximately equal parts of goethite and ferrihydrite (40:60 to 60:40) can be applied to PVC (or other materials including glass) tubing or panels so that it will adhere to these devices. These painted devices can be installed into soils for various purposes.

Figure 14:
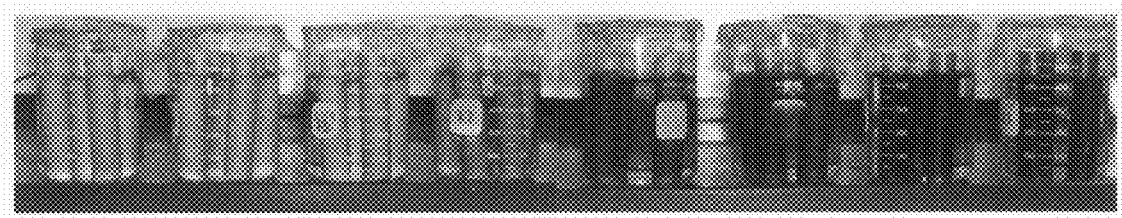
FIG. 14 shows PVC tubing painted with synthetic iron oxide paint (composed of goethite and ferrihydrite) that had been placed in solutions of dissolved sulfide for 1 hour. Concentrations in the solutions are 1, 3, 6, 12, 30, 60, 120, and 300 mg/L, from left to right.
Figure 15:
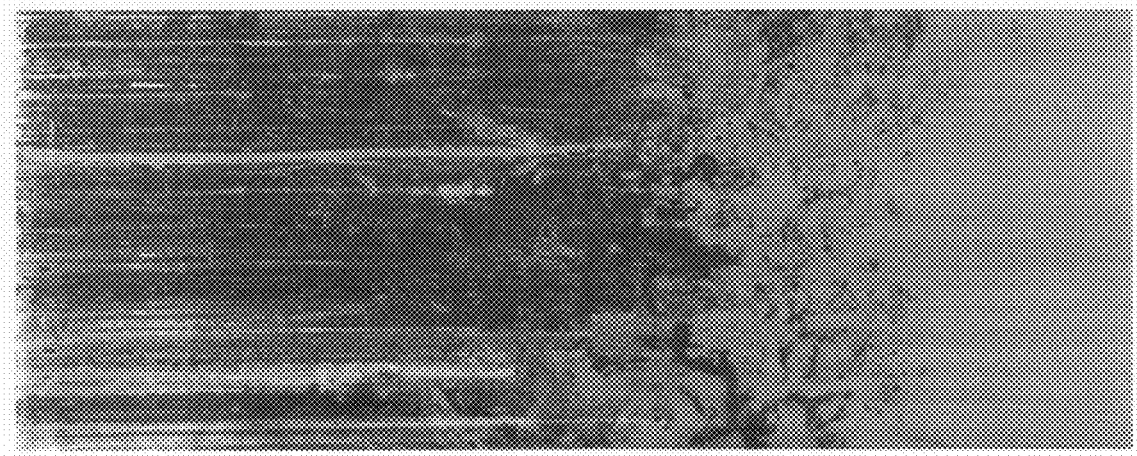
FIG. 15 shows a large panel (50 cm×20 cm) inserted into a tidal marsh soil for 6 hrs and scanned immediately upon removal from the marsh.
Figure 16:
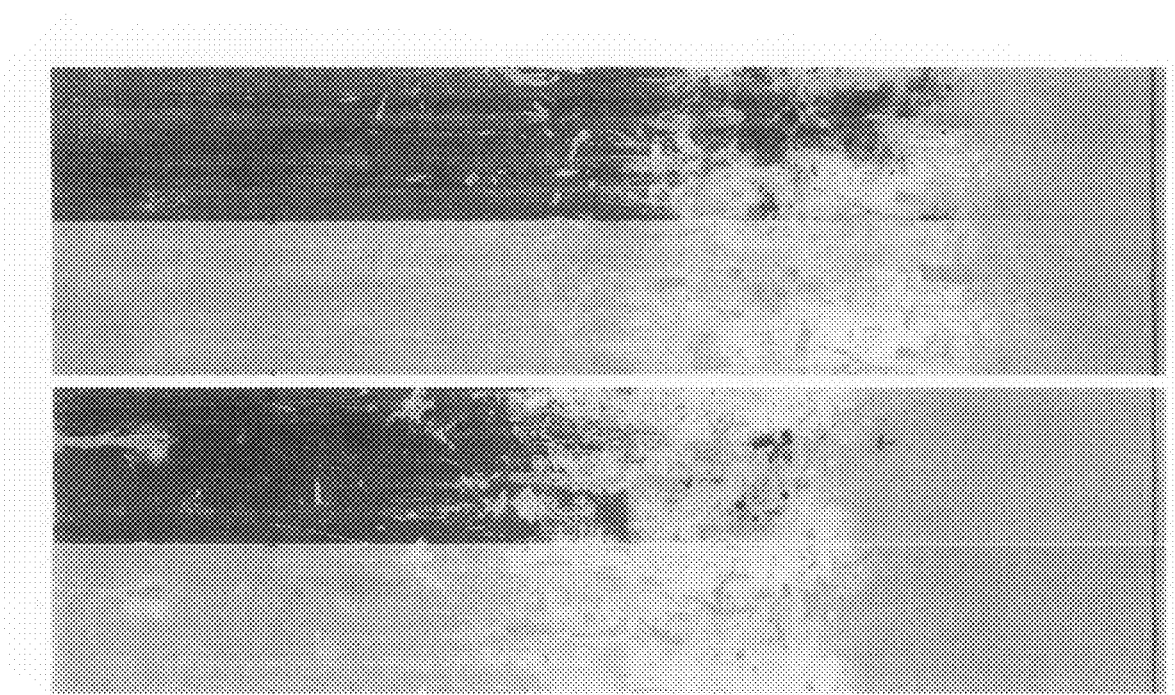
FIG. 16 shows scans of the same two PVC tubes shown in FIG. 15, when initially removed from the marsh (top) and several hours later (below), during which time the iron monosulfide oxidized and the black color faded.

One purpose is to determine whether soils are functioning as hydric soils by actively reducing iron oxides. In those instances, tubes are placed into the soil for 2 to 4 weeks and then removed. The stripping or removal of the iron oxide paint indicates the active reduction of the iron oxides in a hydric soil environment in those zones where the paint is removed. A second application of the iron oxide painted panels or tubes is in estuarine systems where marshes or sediments may contain dissolved sulfide, such as hydrogen sulfide ($H_2S$), sodium sulfide ($Na_2S$). Chemically, the dissolved sulfide reacts with the synthetic iron oxide to form a black iron monosulfide phase (FeS) something akin to the mineral mackinawite. Tubes or panels painted with the iron oxide paint are inserted into the soil for a fixed period of time (typically ranging between 1 hr and 48 hrs, although shorter or longer times may be employed (e.g., 5 minutes to one week). When they are removed, dark gray or black areas indicate where FeS has formed. Thus, qualitatively, the patterns observed on the painted devices indicate the (often intricate) distribution of dissolved sulfide within the complex pore systems of marshes or sediments (FIG. 13). One aspect of the present invention concerns the recognition that higher concentrations of dissolved sulfide cause the gray-black color on the painted surfaces to become darker. Thus, by making comparisons with standards (FIG. 14), quantitative (or at least semi-quantitative) analyses can be inferred as well. When larger panels are used, even greater information can be acquired (FIG. 15). It should be noted that FeS oxidizes quickly when exposed to oxygen. Thus, photos or scans of the iron oxide painted devices are optimally made quickly (within a couple of minutes) after removal from the soil (FIG. 16).

EXAMPLE 4

Synthesized Iron Oxides Used as a Tool for Documenting Reducing Conditions in Soils IRIS tubes extracted from the soil commonly exhibit both white zones (where the iron oxide coating appears to be completely removed) and also yellow zones where the iron oxide coating appears to be only partially removed. It has been hypothesized that the apparent partial removal of the iron oxide coating from some IRIS tubes represents the preferential reduction and dissolution of ferrihydrite over goethite due to thermodynamic constraints. This hypothesis is evaluated below.

Methods

Paint Synthesis—Following procedures outlined in Rabenhorst, M. C. and Burch, S. N. (2006) ("Synthetic Iron Oxides as an Indicator of Reduction in Soils (IRIS)," Soil Sci. Soc. Am. J. 70:1227-1236), 0.2 M $FeCl_3$ was titrated with 1 M KOH to a pH of 11 or 12, forming a ferrihydrite-rich suspension that was then aged at 20° C., facilitating progressive formation of goethite over time. Paint collected from various batches and at various intervals was applied to PVC stubs and to IRIS tubes and was sampled for analysis.

X-Ray Diffraction—Randomly oriented Fe oxide powder were examined by XRD using Cu radiation and a graphite monochrometer.

Chemical Extraction—Acid ammonium oxalate (pH 3) extractions (4 hr in the dark) were used to estimate the ferrihydrite component, and total Fe oxides were extracted using 6M HCl at 80° C. for 2 hr.

Scanning Electron Microscopy—selected samples that had been applied to small (1 cm×1 cm) PVC stubs were coated with Au and examined by SEM at magnifications ranging from 150× to 25,000×.

Mossbauer Spectroscopy—A sample of the Fe oxide scraped from the yellow portion of an IRIS tube that had been placed in a wetland soil was analyzed using Mossbauer spectroscopy (counted 38 days at room temp).

Results

Figure 17:
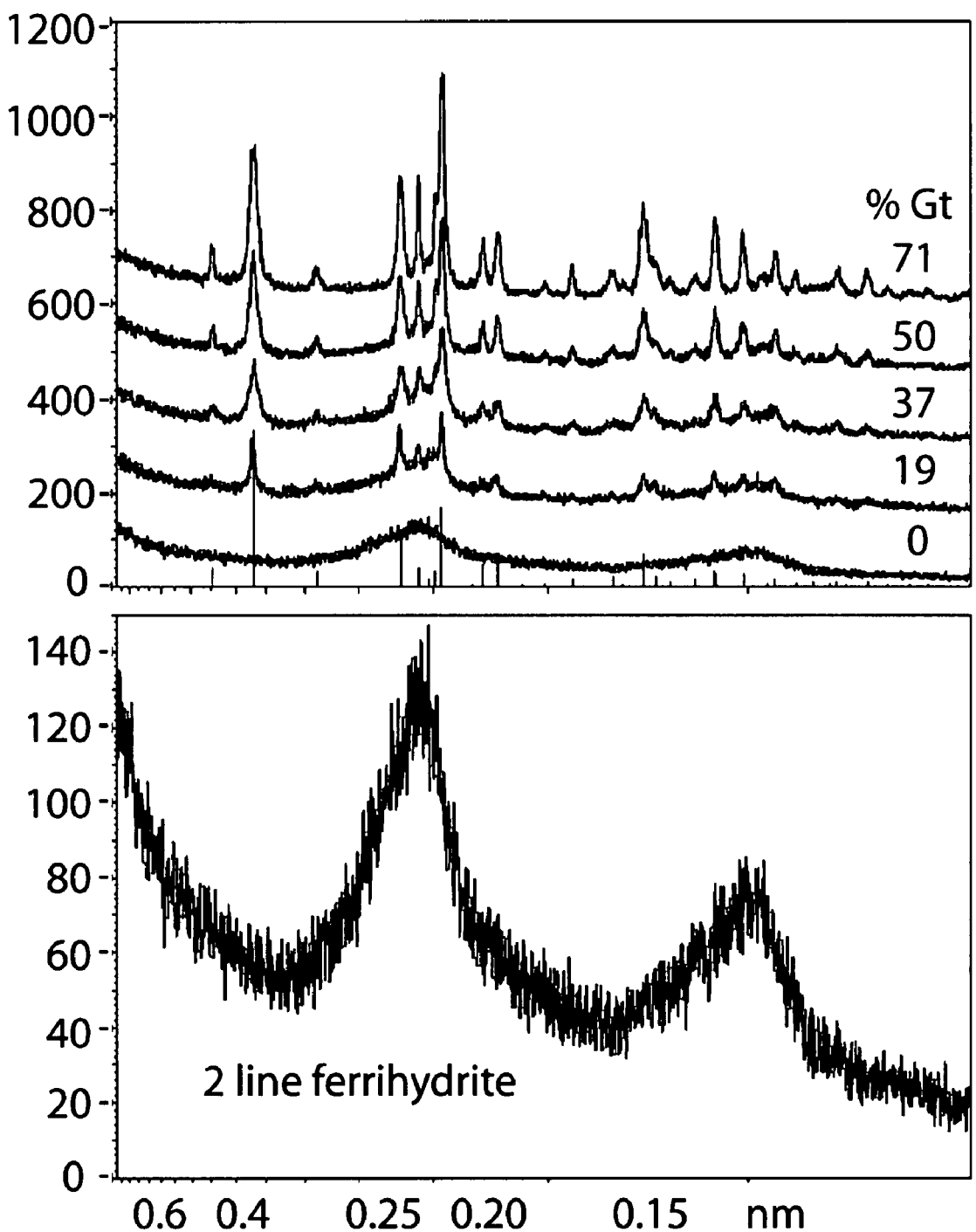
FIG. 17 shows X-ray diffractograms of paint comprised of mixtures of ferrihydrite and goethite (Gt). Also included (top) are the lines from the JCPDS file showing peak locations for goethite.

XRD scans from selected paints are shown in FIG. 17. By modifying the pH of titration and the time of aging, the mineralogical composition of the paints can range from 100% ferrihydrite to dominantly goethite. As expected, the intensity of goethite (Gt) peaks in XRD scans corresponds to a decrease in the proportion of acid ammonium oxalate extractable Fe from the paint.

Using the Scherrer equation based on peak broadening, to estimate crystallite size (Klug, H. P. and Alexander L. E. (1974) X-RAY DIFFRACTION PROCEDURES FOR POLYCRYSTALLINE AND AMORPHOUS MATERIALS, 200 Ed, H. N. Wiley & sons, New York), the mean crystallite size of newly formed ferrihydrite is estimated to be on the order of about 1 nm, whereas the mean crystallite size of the goethite is estimated to be about 10-20 nm. Examination of the SEM of the sample containing 44% goethite shows the presence of goethite laths that are about 20 to 50 nm in width and several hundred nm in length. In paint mixtures containing 37% and 44% goethite, lath-shaped goethite crystals were present which were not apparent in the sample containing only 15% goethite.

Paint containing 15% Gt shows extensive cracking (visible at 1000×) and the formation of discrete particles (about 10 to 30 μm in size) that are poorly connected and prone to easy physical removal. In this material, goethite (Gt) laths are not visible at 25,000×.

In paint containing greater quantities of Gt (37% and 44%) the cracking observed at 1000× is far less common. Also in this paint, lath-shaped Gt crystals are prevalent and appear to form a reinforcing network. This would be analogous to the common practice of masons of adding some strong fibrous material to plaster such as hair or hemp or the ancient practice of adding straw to clay when making bricks to increase their strength and cohesion. Thus, the growth of goethite laths within the Fe oxide mixture appears to contribute to the strength and cohesion of the material.

Figure 18:
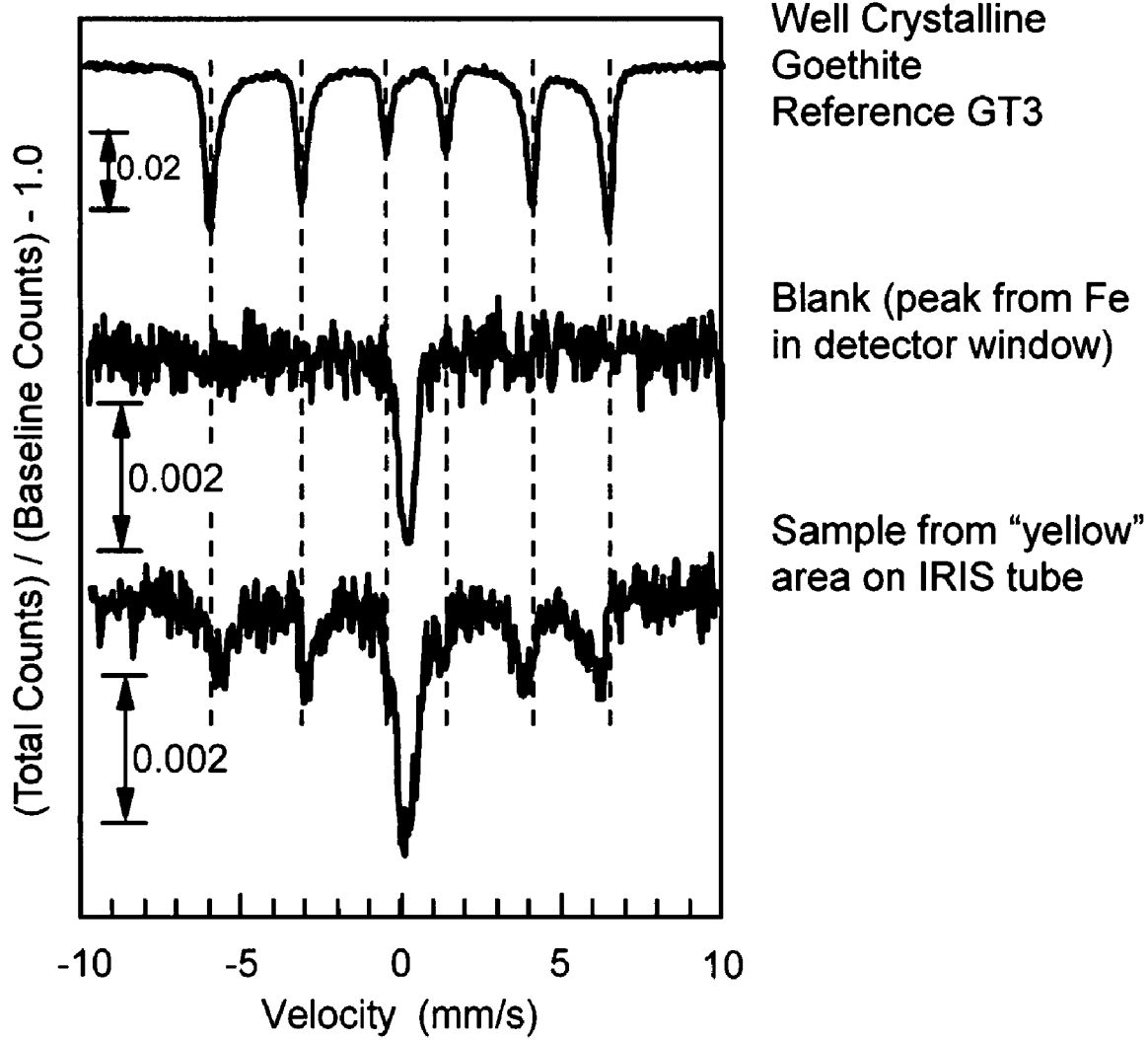
FIG. 18 shows the Mossbauer (MB) spectrum of sample from yellow area on IRIS tube compared with MB spectra from reference goethite and a blank.

FIG. 18 shows the Mossbauer (MB) spectrum of sample from yellow area on IRIS tube compared with MB spectra from reference goethite and a blank. Sample size for the reference goethite was about 35 mg Fe oxide whereas yellow sample conditioning about 2 to 5 mg Fe oxide. The Fe oxide in the yellow area is dominantly well crystalline goethite as evidenced by sextet in the MB spectrum collected it room temperature (Rabenhorst, M. C., D. W. Ming, and R. V. Morris, 2006. Synthesized Iron Oxides Used as a Tool for Documenting Reducing Conditions in Soils. 18th World Congress of Soil Science, Philadelphia, Pa. Jul. 9-15, 2006, Abstracts).

Table 2 shows the means (and standard errors) of four replicate sequential extractions of red and yellow portions of painted glass slides installed in a wetland soil for 35 days. Based upon oxalate and total Fe extractions, the red (presumably unaltered) areas were comprised equally of goethite and ferrihydrite whereas the yellow areas were dominantly (93%) goethite.

TABLE 2

| Sample | | $Fe_{ox}$ | $Fe_{6M\,HCL}$ μg/cm² | $Fe_{Total}$ | Fh % | Gt |
|---|---|---|---|---|---|---|
| Red | Mean | 55.5 | 56.2 | 111.6 | 49.8 | 50.2 |
| | SE | 3.0 | 4.1 | 7.0 | 0.7 | 0.7 |
| Yellow | Mean | 5.1 | 72.2 | 77.3 | 6.7 | 93.3 |
| | SE | 0.9 | 9.9 | 10.2 | 1.3 | 1.3 |

In sum, the goethite in IRIS Fe oxide paint forms as lath-shaped crystals up to several hundred nm in length. These elongated crystals appear to contribute strength and cohesion to the paint coatings on IRIS tubes in a manner analogous to adding hair or straw to plaster. This helps to prevent sloughing and increases the durability of paint applied to PVC IRIS tubes. The development of yellow areas on IRIS tubes represents a partial removal of the Fe oxide paint form the tubes. Based upon Mossbauer spectroscopy and differential extractions, the yellow component remaining has been demonstrated to be primarily goethite. Thus, consonant with predictions based on thermodynamics, it appears that the redder ferrihydrite is preferentially removed leaving the yellower goethite behind.

EXAMPLE 5

Reduction of Iron Oxides in Wetland Soils

Based upon thermodynamics, ferrihydrite is predicted to be more easily reduced at higher redox potentials than goethite. Therefore, the relative performance of IRIS tubes made using paint comprised of different proportions of ferrihydrite and goethite and placed within wetland oils was evaluated. This experiment presented below was conducted to test this hypothesis.

Following the protocol of Rabenhorst, M. C. and Burch, S. N. (2006) ("Synthetic Iron Oxides as an Indicator of Reduction in Soils (IRIS)," Soil Sci. Soc. Am. J. 70:1227-1236), IRIS Fe oxide paint was synthesized by titrating 0.2M $FeCl_3$ with 1 M KOH to a pH of 11 or 12. The composition of the initial Fe oxide was dominantly ferrihydrite, but when stored at room temperature, would become transformed to goethite over a matter of days or weeks. IRIS tubes were manufactured using nine different paints with varying mineralogical composition (Table 3). A portion of each of the paints used to manufacture IRIS tubes was freeze dried for analysis. A randomly oriented powder of each sample was examined by XRD using Cu radiation and a graphite monochrometer. A greater intensity of goethite peaks was observed when higher proportions of goethite were present. Each sample was also extracted for 4 hr in the dark using 0.2 M ammonium acetate adjusted to pH 3, to estimate the poorly crystalline forms (ferrihydrite) and then also using 6M HCl at 80° C. to determine total Fe oxides. Goethite Fe was estimated as the difference between the two extractions (Table 3).

TABLE 3

Mineralogical Composition of Nine IRIS Fe Oxide Paints

| # | | % Fh | % Gt | Fh:Gt |
|---|---|---|---|---|
| 1 | 0520 75 d | 59.5 | 40.5 | 1.47 |
| 2 | 0521 22 d | 84.8 | 15.2 | 5.58 |
| 3 | 0521 33 d | 80.9 | 19.1 | 4.24 |
| 4 | 0523 36 d | 63.3 | 36.7 | 1.72 |
| 5 | 0601 10 d | 46.6 | 53.4 | 0.87 |
| 6 | 0601 14 d | 35.0 | 65.0 | 0.54 |
| 7 | 0602 9 d | 29.1 | 70.9 | 0.41 |
| 8 | 0603 4 d | 50.0 | 50.0 | 1.00 |
| 9 | 0604 9 d | 56.3 | 43.7 | 1.29 |

* based upon acid ammonium oxalate and total Fe analyses; Fh (ferrihydrite); Gt (goethite)

Figure 20:
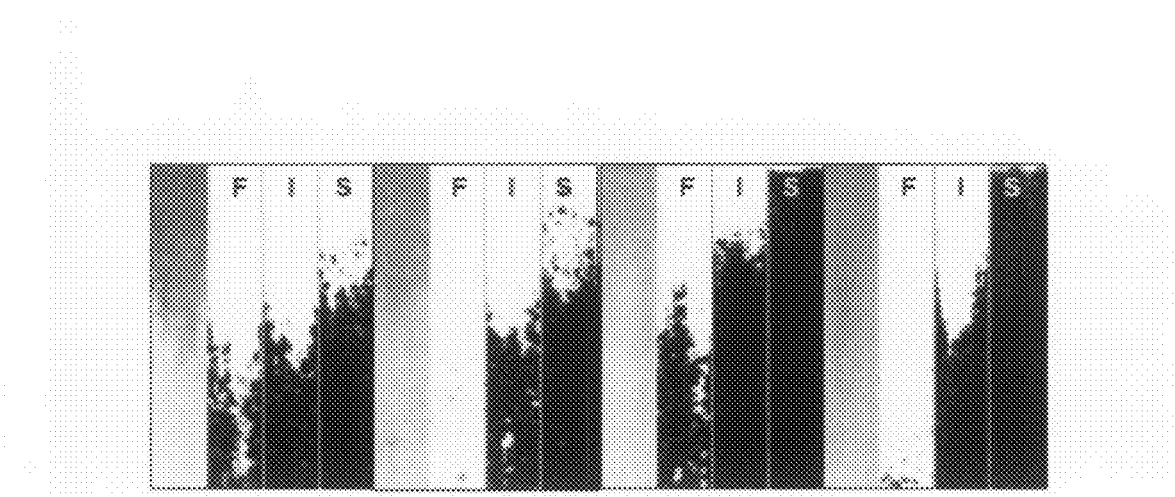
FIG. 20 shows images of representative scanned IRIS tubes and their accompanying binary (B&W) images that indicate areas (black) where removal of the IRIS Fe oxide paint was substantial (S) intermediate (I) or full (F).
Figure 19:
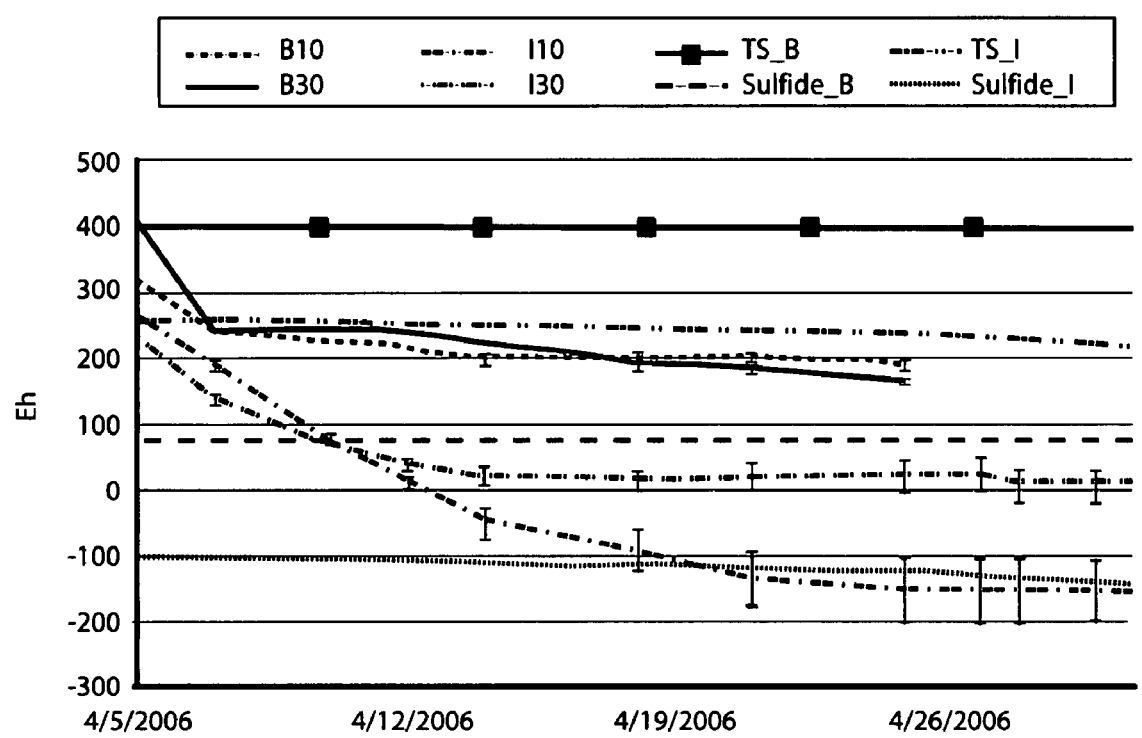
FIG. 19 shows the redox potential (Eh) in the Berryland (B) and Indiantown (I) mesocosms measured at depths of 10 and 30 cm. Lines show means and standard errors for 5 replicate electrodes. Also shown are the Hydric Soils Technical Standard line for Fe reduction (TS) and the sulfide stability line based upon pH values measured in the mesocosms.
Figure 21:
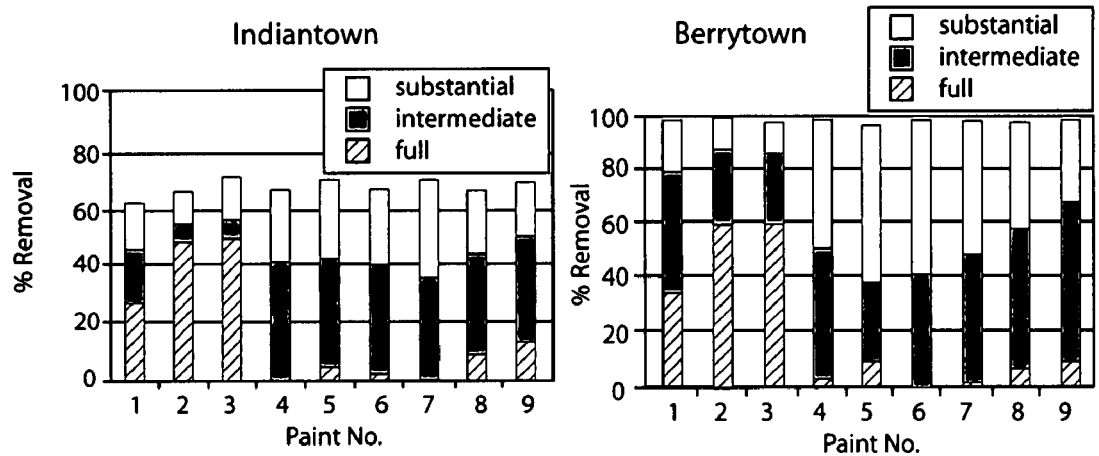
FIG. 21 shows the proportion of IRIS Fe oxide paint removed from IRIS tubes after 13 days. Bars front top to bottom: substantial (S), intermediate (I) or full (F); data are means 4 tubes.
Figure 22:
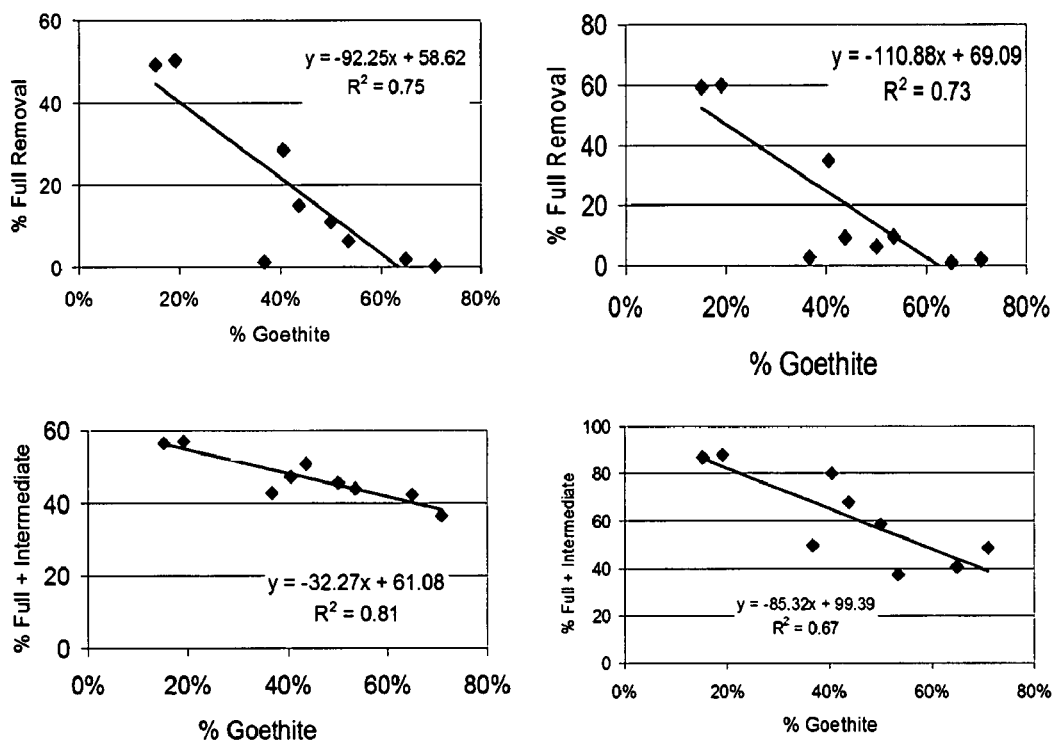
FIG. 22 shows the removal of the IRIS Fe oxide paint for IRIS tubes as a function of the goethite content of the paint.

Tests were conducted on soil samples Indiantown (taxonomic class: Cumulic Humaquepts; texture: silt loam; % OC=6.67) and Berryland (taxonomic class: Typic Alaquods; texture: loamy sand; % OC=5.47). Approximately 80 L of material from the A horizons of the soils were homogenized and placed into mesocosms (approximately 55 cm high×45 cm diam). The mesocosms were saturated by adding distilled water through a piezometer located in the center of each mesocosm and once saturated, the water level was maintained at approximately 1 cm above the soil surface. Four replicate IRIS tubes (of each of the 9 paint types discussed above; 36 tubes total per soil sample) were inserted into each mesocosm using a randomized design. Ten Pt electrodes were inserted into each mesocosm (5 at 30 cm and 5 at 10 cm) and were monitored at regular intervals. The soil pH was measured at regular intervals. The redox potential (Eh) in the Berryland (B) and Indiantown (I) mesocosms measured at depths of 10 and 30 cm are shown in FIG. 19. The data demonstrate that the mesocosms were "reducing" with respect to Fe throughout the study period and that the upper portion (10 cm) of the Indiantown soil dropped into the sulfide stability zone after approximately two weeks. Following extraction, a scanner was used to obtain digital images of the IRIS tubes which were then composited to produce an image of each tube. Substantial (S), intermediate (I) and full (F) removal of the Fe oxide paint from tubes IRIS documented and quantified using Image Tool software. FIG. 20 shows images of representative scanned IRIS tubes. The proportion of Fe oxide paint removed from IRIS tubes after 13 days is shown in FIG. 21 (from top to bottom: substantial (S), intermediate (I) or full (F); data are means of 4 tubes). FIG. 22 shows the removal of the IRIS Fe oxide paint from IRIS tubes as a function of the goethite content of the paint.

The data thus demonstrate that the mineralogical composition of the Fe oxide paint used in IRIS tubes does affect the degree to which the paint is removed from the tubes under reducing conditions in the soil. Additionally, use of paints with higher proportions of goethite (relative to ferrihydrite) results in less of the paint being removed from the tubes, fully or to an intermediate degree. Therefore, in order to ensure uniformity of operation, the mineralogical composition of the paint used in IRIS tube manufacture should be restricted to a preferred range in goethite content of between about 40%-about 60%, and more preferably to about 50%.

All publications and patents mentioned in this specification are herein incorporated by reference to the same extent as if each individual publication or patent application was specifically and individually indicated to be incorporated by reference in its entirety. While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth.

What is claimed is:

1. An IRIS Fe oxide paint, said paint comprising a liquid composition comprising iron oxide, said iron oxide comprising from about 30 to about 70 mole percent goethite.

2. The IRIS Fe oxide paint of claim 1, wherein said iron oxide comprises from about 40 to about 60 mole percent goethite.

3. The IRIS Fe oxide paint of claim 2, wherein said iron oxide comprises about 50 mole percent goethite.

4. A solid support having a coating comprising a dried residue of an IRIS Fe oxide liquid paint composition, wherein said iron oxide of said IRIS Fe oxide paint comprises iron oxide, said iron oxide comprising from about 30 to about 70 mole percent goethite.

5. The solid support of claim 4, wherein said iron oxide of said Fe oxide liquid paint composition comprises from about 40 to about 60 mole percent goethite.

6. The solid support of claim 5, wherein said iron oxide of said Fe oxide liquid paint composition comprises about 50 mole percent goethite.

7. The solid support of claim 4, wherein said support is polyvinyl chloride.

8. The solid support of claim 7, wherein said polyvinyl chloride support is a polyvinyl chloride tube.

9. A method of improving the adhesion and durability of an IRIS Fe oxide paint, which comprises the steps:
 (A) titrating (i) an IRIS Fe oxide paint solution containing a water soluble Fe(III) salt with (ii) a base, to a pH greater than 9; and
 (B) permitting conversion of said iron oxide to from about 30 to about 70 mole percent goethite;
 wherein the presence of said goethite improves the adhesion and durability of said IRIS Fe oxide paint.

10. The method of claim 9, wherein said IRIS Fe oxide paint solution is titrated to a pH greater than 11.

11. The method of claim 9, wherein said Fe oxide in said IRIS Fe oxide paint solution is converted from about 40 to about 60 mole percent goethite.

12. The method of claim 11, wherein said Fe oxide in said IRIS Fe oxide paint solution is converted to about 50 mole percent goethite.

13. A method of evaluating the reduction state of soil, which comprises measuring a change in the coloration of a support that comprises a coating of dried residue of an IRIS Fe oxide paint, wherein the iron oxide of said paint comprises from about 30 to about 70 mole percent goethite.

14. The method of claim 13, wherein the iron oxide of sad paint comprises from about 40 to about 60 mole percent goethite.

15. The method of claim 14, wherein the iron oxide of said paint comprises about 50 mole percent goethite.

16. The method of claim 13, wherein said soil is a hydric soil.

17. The method of claim 13, wherein said soil is a wetlands soil.

18. The method of claim 13, wherein said soil is a soil of an estuarine system.

19. The method of claim 18, wherein said method evaluates dissolved sulfide.

* * * * *

UNITED STATES PATENT AND TRADEMARK OFFICE
CERTIFICATE OF CORRECTION

PATENT NO. : 7,550,297 B2
APPLICATION NO. : 11/678995
DATED : June 23, 2009
INVENTOR(S) : Martin C. Rabenhorst It is certified that error appears in the above-identified patent and that said Letters Patent is hereby corrected as shown below:

At Column 1, Line 21, "stilt" should be -- still --.
At Column 2, Line 14, "Drill" should be -- Till --.
At Column 2, Line 17, "(IRIS): Visual Method" should be -- (IRIS): A Visual Method --.
At Column 3, Line 10, "transferred" should be -- transformed --.
At Column 4, Line 16, "estaurine" should be -- estuarine --.
At Column 4, Line 41, "to pH values of 7.5" should be -- to a pH value of 7.5 --.
At Column 4, Line 46, "chloride KOH" should be -- chloride with KOH --.
At Column 5, Line 5, "paints the present invention" should be -- paints of the present invention --.
At Column 5, Line 11, "initially 5% goethite" should be -- initially containing 5% goethite --.
At Column 5, Line 32, "paint comprised" should be -- paints comprised --.
At Column 5, Line 51, "Bars front top" should be -- Bars from top --.
At Column 5, Line 61, "stick" should be -- such --.
At Column 6, Line 15, "empircal" should be -- empirical --.
At Column 6, Line 16, "$Fe^{3+}{}_5HO_8.0.5(H_2O)$" should be -- $Fe^{3+}{}_5HO_8 \cdot 0.5(H_2O)$ --.
At Column 6, Line 28, "tritrated" should be -- titrated --.
At Column 6, Line 34, "tritration" should be -- titration --.
At Column 7, Line 8, "support" should be -- supports --.
At Column 7, Line 15, "it room temperature" should be -- at room temperature --.
At Column 8, Line 61, "Ph" should be -- pH --.
At Column 9, Line 25, "it" should be -- in --.
At Column 10, Line 29, "condition" should be -- conditions --.
At Column 10, Line 32, "soil" should be -- soils --.
At Column 11, Line 7, "Fe oxides particularly" should be -- Fe oxides is particularly --.
At Column 12, Line 47, "powder" should be -- powders --.
At Column 13, Line 36, "conditioning" should be -- contained --.
At Column 13, Line 67, "form" should be -- from --.

UNITED STATES PATENT AND TRADEMARK OFFICE
CERTIFICATE OF CORRECTION

PATENT NO. : 7,550,297 B2
APPLICATION NO. : 11/678995
DATED : June 23, 2009
INVENTOR(S) : Martin C. Rabenhorst It is certified that error appears in the above-identified patent and that said Letters Patent is hereby corrected as shown below:

At Column 15, Line 13, "IRIS" should be -- was --.
At Column 16, Line 39 (Line 1 of Claim 14), "sad" should be -- said --.

Signed and Sealed this

First Day of September, 2009

David J. Kappos
*Director of the United States Patent and Trademark Office*